United States Patent
Muquit et al.

(10) Patent No.: US 8,798,329 B2
(45) Date of Patent: Aug. 5, 2014

(54) AUTHENTICATION APPARATUS, AUTHENTICATION METHOD, REGISTRATION APPARATUS AND REGISTRATION METHOD

(75) Inventors: Mohammad Abdul Muquit, Kanagawa (JP); Hiroshi Abe, Tokyo (JP)

(73) Assignee: SonyCorporation, Tokyo (JP)

( * ) Notice: Subject to any disclaimer, the term of this patent is extended or adjusted under 35 U.S.C. 154(b) by 1173 days.

(21) Appl. No.: 12/350,340

(22) Filed: Jan. 8, 2009

(65) Prior Publication Data

US 2009/0175505 A1    Jul. 9, 2009

(30) Foreign Application Priority Data

Jan. 9, 2008  (JP) .............................. P2008-002630

(51) Int. Cl.
*G06K 9/00* (2006.01)
*G06F 21/32* (2013.01)
*G06F 17/30* (2006.01)

(52) U.S. Cl.
CPC ................ *G06F 21/32* (2013.01); *G06F 17/30* (2013.01)
USPC ....................................................... 382/115

(58) Field of Classification Search
USPC ....................................................... 382/124
See application file for complete search history.

(56) References Cited

U.S. PATENT DOCUMENTS

| | | | | |
|---|---|---|---|---|
| 7,680,305 | B2* | 3/2010 | Miura et al. | 382/115 |
| 2001/0026632 | A1* | 10/2001 | Tamai | 382/116 |
| 2002/0028004 | A1* | 3/2002 | Miura et al. | 382/124 |
| 2004/0096087 | A1* | 5/2004 | Funahashi | 382/124 |
| 2005/0180636 | A1 | 8/2005 | Iizuka | |
| 2006/0078176 | A1* | 4/2006 | Abiko et al. | 382/124 |
| 2006/0098848 | A1* | 5/2006 | Nagasaka et al. | 382/124 |
| 2007/0036400 | A1* | 2/2007 | Watanabe et al. | 382/124 |
| 2007/0058841 | A1* | 3/2007 | Miura et al. | 382/115 |
| 2007/0177769 | A1* | 8/2007 | Motoyama et al. | 382/115 |
| 2007/0230753 | A1* | 10/2007 | Kitane et al. | 382/124 |

FOREIGN PATENT DOCUMENTS

JP    2005-215883    8/2005

* cited by examiner

*Primary Examiner* — Hadi Akhavannik
(74) *Attorney, Agent, or Firm* — Sony Corporation

(57) ABSTRACT

An authentication apparatus includes: a vein data extracting unit that extracts vein data representing veins, from an image including the veins existing in a finger; an extracting unit that extracts position data representing the position which the contour of the finger has at an intermediate stage of extracting the vein data; and a determining unit that determines a collation candidate to be collated with the vein data, from the similarity between the position data and data associated with vein data to be registered.

20 Claims, 20 Drawing Sheets

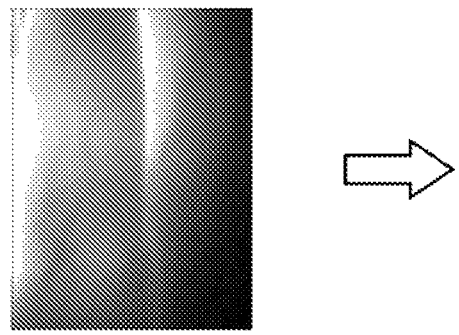 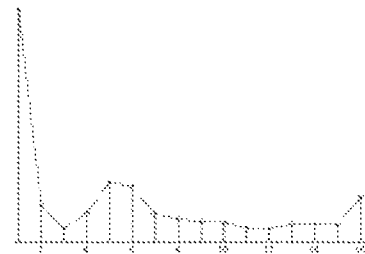
FIG. 8A  FIG. 8B
 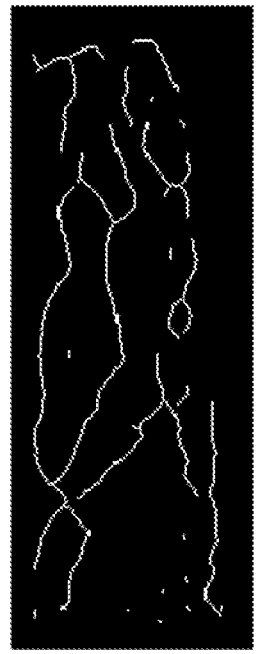
FIG. 9A  FIG. 9B

AUTHENTICATION APPARATUS, AUTHENTICATION METHOD, REGISTRATION APPARATUS AND REGISTRATION METHOD

CROSS-REFERENCE TO RELATED APPLICATIONS

The present invention contains subject matter related to Japanese Patent Applications JP2008-002630 filed in the Japanese Patent Office on Jan. 9, 2008, and JP2008-126207 filed in the Japanese Patent Office on May 13, 2008, the entire contents of which being incorporated herein by reference.

BACKGROUND OF THE INVENTION

1. Field of the Invention

The present invention relates to an authentication apparatus, an authentication method, a registration apparatus and a registration method, which are suitable for use in biometric authentication.

2. Description of the Related Art

Systems are known, in which the data representing the entrance and exit of persons to and from a certain place is stored in a memory. The data may be retrieved from the memory in order to determine whether a person who has just input the data item identical to any data item registered in the memory is indeed registered in the system. In this case, so-called "1:N authentication" is performed, whereby the data item input and concerning the person is collated with the data items stored in the memory.

Authentication apparatuses of such a type have been proposed. (refer to, e.g., Jpn. Pat. Appln. Laid-Open Publication No. 2005-215883). Any authentication apparatus of this type generates a converted registration image of low-resolution image and a converted collation image of low-resolution from registration images and collation images of a person to be authenticated. The authentication apparatus then determines whether a registration image that is the source of a preset number of converted registration images that have high degree of correlation with the converted collation image represents any person registered in the apparatus, from the result of collation between the registration images and the image of the person to authenticate.

SUMMARY OF THE INVENTION

In the authentication apparatus of this configuration, a converted collation image is generated from the collation image of the person to authenticate. Therefore, whether the person has been registered or not cannot be determined unless a collation image of this person is generated. This decreases the authentication speed.

In this authentication apparatus, the converted registration image and the converted authentication image are generated by the Huff transform. The Huff transform is a process of quantitatively finding, in a $\rho$-$\theta$ space, the linear components of an image (x-y plane image) that should be converted.

The linear components quantitatively found include not only continuous lines, but also the line segments arranged in a straight line, forming a broken line (or a dotted line). That is, any registration image to collate with the collation image of a person to authenticate is determined from the low degree of correlation based on the elements not contained in the registration images or the collation images. Consequently, the registration image that is the source of converted registration images that have high degree of correlation with the converted collation image may probably not include the registration image of the person registered. This inevitably decreases the authentication speed.

The present invention has been made in view of the foregoing and aims to provide an authentication apparatus, an authentication method, a registration apparatus and a registration method.

According to an aspect of the present invention, there is provided an authentication apparatus that includes: a vein data extracting unit that extracts vein data representing veins, from an image including the veins existing in a finger; an extracting unit that extracts position data representing the position which the contour of the finger has at an intermediate stage of extracting the vein data; and a determining unit that determines a collation candidate to be collated with the vein data, from the similarity between the position data and data associated with vein data to be registered.

According to another aspect of the present invention, there is provided an authentication method that includes: a step of extracting vein data representing veins, from an image including the veins existing in a finger; a step of extracting position data representing the position which the contour of the finger has at an intermediate stage of extracting the vein data; and a step of determining a collation candidate to be collated with the vein data, from the similarity between the position data and data associated with vein data to be registered.

According to yet another aspect of the present invention, there is provided a registration apparatus that includes: a vein data extracting unit that extracts vein data representing veins, from an image including the veins existing in a finger; a key data extracting unit that extracts key data representing the state which the finger has at an intermediate stage of extracting the vein data; and a registering unit that registers, in a storage unit, the vein data in association with the key data.

According to further another aspect of the present invention, there is provided a registration method that includes: a vein data extracting step of extracting vein data representing veins, from an image including the veins existing in a finger; a key data extracting step of extracting key data representing the state which the finger has at an intermediate stage of extracting the vein data; and a registering step of registering, in a storage unit, the vein data in association with the key data.

According to the present invention, the position a finger contour has at an intermediate stage of extracting vein data is used as an element for determining a collation candidate. The collation candidate can therefore be determined before the vein data is extracted. Further, a collation candidate can be accurately determined based on biometrical elements directly, not influenced by pseudo elements such as Huff-transform images. The invention can therefore realize an authentication apparatus, an authentication method, a registration apparatus, and a registration method, which can operate at high speed.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 8A and 8B are schematic diagrams explaining how to extract a luminance histogram;

FIGS. 9A and 9B are schematic diagrams showing two images of the same veins, acquired before and after the vein-width reducing process, respectively;

DETAILED DESCRIPTION OF THE PREFERRED EMBODIMENTS

Embodiments of the present invention will be described in detail, with reference to the accompanying drawings.

Figure 1:
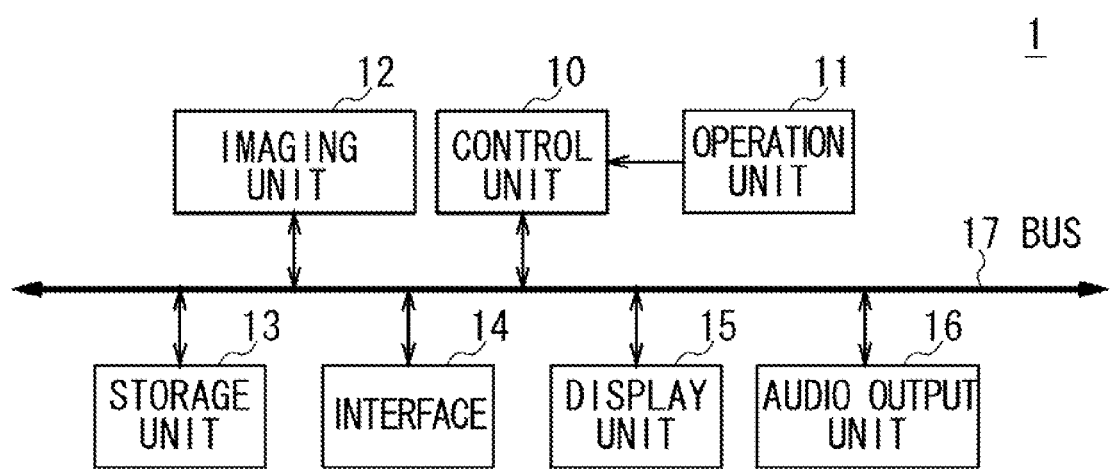
FIG. 1 is a block diagram showing the configuration of an authentication apparatus according to an embodiment of the invention.

(1) First Embodiment (1-1) Circuit Configuration of Authentication Apparatus FIG. 1 shows the circuit configuration of an authentication apparatus 1 according to a first embodiment of the present invention. The authentication apparatus 1 includes a control unit 10, an operation unit 11, an imaging unit 12, a storage unit 13, an interface 14, a display unit 15, and an audio output unit 16. The units 12 to 16 are connected to the control unit 10 via a bus 17. The operation unit 11 is directly connected to the control unit 10.

The control unit 10 is a computer composed of a central processing unit (CPU), a read only memory (ROM), and a random access memory (RAM). The CPU controls the entire components of the authentication apparatus 1. The ROM stores various programs including an activation program. The RAM works as a work memory for the CPU.

The operation unit 11 may be operated to input a command COM1 and a command COM2 to the control unit 10. If the command COM1 is input to the control unit 10, the authentication apparatus 1 will operate in a mode of registering the veins of a user (hereinafter called "registrant.") (Hereinafter, this operating mode will be referred to as "vein registration mode.") If the command COM2 is input to the control unit 10, the authentication apparatus 1 will operate in a mode of identifying the registrant. (Hereinafter, this operating mode will be referred to as "authentication mode.")

From the command COM1 or COM2, the control unit 10 determines the mode in which the apparatus 1 should operate. The control unit 10 then controls the imaging unit 12, storage unit 13, interface 14, display unit 15 and audio output unit 16 in accordance with the program associated with the command COM1 or COM2. The authentication apparatus 1 therefore operates in either the vein registration mode or the authentication mode.

The imaging unit 12 has a light source that applies light to the cushion of the registrant's finger laid on the light-input surface of the authentication apparatus 1. The light applied passes the vein layer in the finger, reaching the layer behind the vein layer. The light (hereinafter referred to as "near-infrared light") includes beams having wavelengths (700 nm to 900 nm), which are uniquely absorbed by both deoxygenated hemoglobin and oxygenated hemoglobin.

The imaging unit 12 generates, at regular intervals, video data representing the image of the veins in the part of living body laid on the light-input surface of the apparatus 1. The video data thus generated is supplied to the control unit 10.

The storage unit 13 is provided to store the data (hereinafter called "vein data") about the veins included in an image to register. The storage unit 13 stores programs and various data items such setting data items. The storage unit 13 also stores data designated by the control unit 10. Such data can be read from the storage unit 13.

The interface 14 can transmit and receive various data items to and from any external apparatus connected to the authentication apparatus 1 through a specific transmission path.

The display unit 15 displays, on a screen, the characters and figures represented by the display data supplied from the control unit 10. The audio output unit 16 has a speaker generate sound based on the audio data supplied from the control unit 10.

(1-1-1) Vein Registration Mode

Figure 2:
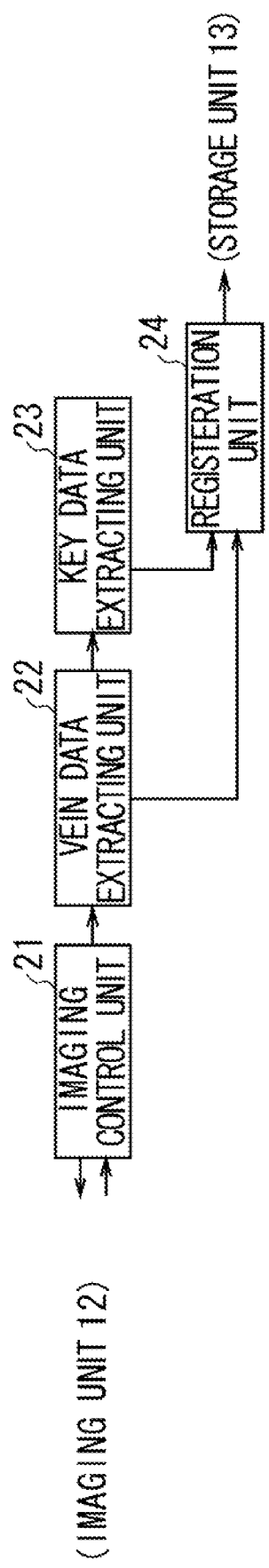
FIG. 2 is a block diagram showing the functional configuration (1) of the control unit when the authentication apparatus is working in the vein registration mode.

The vein registration mode will be explained. Once the authentication apparatus 1 has been set to the vein registration mode, the control unit 10 causes the display unit 15 or the audio output unit 16, or both, to give a message, asking the registrant to place his or her finger on the light-input surface of the apparatus 1. Then, the control unit 10 functions as an imaging control unit 21, a vein data extracting unit 22, a key data extracting unit 23, and a registration unit 24, as is illustrated in FIG. 2.

The imaging control unit 21 drives the light source, which applies near-infrared light to the finger. In the finger, the near-infrared light passes through the vein layer, reaching the layer behind the vein layer. In the finger, the light is scattered and reflected. That part of the light, which is reflected, travels through the vein layer and skin surface layer, back to the light-input surface of the authentication apparatus 1. The near-infrared light traveling back to the light-input surface is guided to the imaging surface of the imaging unit 12. On the imaging surface, the near infrared light forms a high-contrast image that includes bright parts, i.e., the non-vein parts of the finger, and dark parts, i.e., the veins in the finger. The parts representing the veins are dark because the hemoglobin contained in the blood flowing in the veins absorbs much light. (Hereinafter, those parts of the reflected light, which represent the veins, will be called generally "vein projection light.")

The imaging control unit 21 adjusts the position of an optical lens, bringing the images of veins to focus, based on the video data output from the imaging unit 12. Further, the imaging control unit 21 adjusts the opening of the diaphragm and the shutter speed (exposure time) for the imaging element, based on a prescribed exposure value (EV). Therefore, the imaging unit 12 is set to imaging conditions that are optimal to image the veins running in the finger placed on the light-input surface.

Set to the optimal imaging conditions, the imaging control unit 21 supplies to the video data given by the imaging unit 12, to the vein data extracting unit 22.

The vein data extracting unit 22 extracts vein data from the video data supplied from the imaging control unit 21 and representing the vein image. Thus, the vein data extracted is originated from the data output of the imaging unit 12.

From the vein data extracting unit 22, the key data extracting unit 23 acquires video data generated at a prescribed stage of the process of extracting the vein data. The video data acquired is used as a key of a collation candidate. (Hereinafter, this video data will be also called "key data.")

The registration unit 24 registers the vein data the vein data extracting unit 22 has extracted, in association with the key data extracted by the key data extracting unit 23, in the storage unit 13.

Thus, the control unit 10 registers in the storage unit 13 the vein data and the key data representing a state the vein data assumes at the prescribed stage of the process of extracting the vein data, if the authentication apparatus 1 is set to the vein registration mode.

(1-1-2) Authentication Mode

Figure 3:
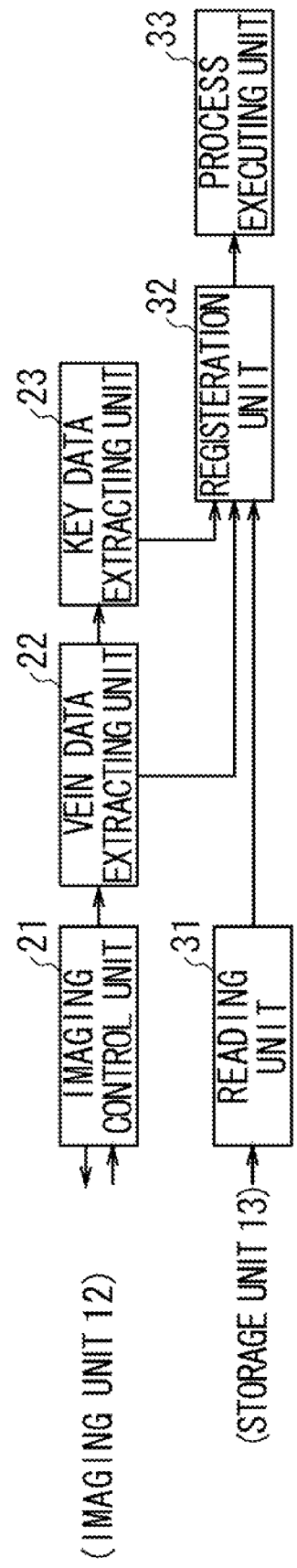
FIG. 3 is a block diagram showing the functional configuration (1) of the control unit when the authentication apparatus is working in the authentication mode.

The authentication mode will be explained. Once the authentication apparatus 1 has been set to the authentication mode, the control unit 10 instructs the display unit 15 or the audio output unit 16, or both, to give a message, asking the registrant to place his or her finger on the light-input surface of the apparatus 1. Then, the control unit 10 starts functioning as an imaging control unit 21, a vein data extracting unit 22, a key data extracting unit 23, a reading unit 31, an authentication unit 32, and a process executing unit 33, as is illustrated in FIG. 3 in which corresponding components are designated by the same reference numerals as in FIG. 2.

The imaging control unit 21 drives the near infrared light source and sets the imaging unit 12 to imaging conditions. The vein data extracting unit 22 extracts vein data from the video data supplied from the imaging unit 12 via the imaging control unit 21, in the same way as in the vein registration mode. The vein data about the registrant is thus extracted.

The storage unit 13 may store a plurality of vein data items about the registrant. In this case, the key data extracting unit 23 acquires from the vein data extracting unit 22 the video data generated at the same stage in the vein registration mode of the process of extracting the vein data and then extracts key data in the same way as in the vein registration mode.

The storage unit 13 may store only one vein data item about the registrant. In this case, the reading unit 31 reads the vein data item and supplies the same to the authentication unit 32. The authentication unit 32 determines whether the user is an authenticated registrant or not, from both the vein data that the reading unit 31 has read from the storage unit 13 and the vein data the vein data extracting unit 22 has extracted (in other words, whether the authentication has been successfully accomplished or not).

On the other hand, the storage unit 13 may store a plurality of vein data items about the registrant. If this is the case, the reading unit 31 reads the key data associated with the vein data items from the storage unit 13 and supplies the key data to the authentication unit 32. The authentication unit 32 determines a collation candidate that should be extracted by the vein data extracting unit 22, from both the key data about the registrant, which the data the reading unit 31 has read from the storage unit 13, and the key data about the registrant, which the extracting unit 23 has extracted.

The authentication unit 32 causes the reading unit 31 to read the vein data about the registrant, which has been determined as the collation candidate. Using the vein data thus read and the vein data about the registrant extracted by the vein data extracting unit 22, the authentication unit 32 determines whether the user is an authenticated registrant (that is, whether the authentication has been successfully accomplished or not).

If the authentication unit 32 determines that the registrant is authenticated (if the authentication has been successfully accomplished), the process executing unit 33 generates control data for starting a specific process. The control data is supplied to an internal or external apparatus connected to the interface 14. The internal or external apparatus performs the specific process of, for example, keeping a door locked for a preset time or releasing the operating mode of a controlled object.

If the authentication unit 32 determines that the registrant is not authenticated, the process executing unit 33 instructs the display unit 15 or the audio output unit 16, or both, to give a message telling that the registrant is not authenticated.

Thus, using the vein data of the person to register and the key data indicating the state the vein data of the person to authenticate has at a specific stage of the process of extracting the vein data, the control unit 10 acquires a collation candidate that should be collated with the vein data of the person to authenticate while the authentication apparatus 1 remains in the vein registration mode.

(1-2) Configuration of Vein Data Extracting Unit

Figure 4:
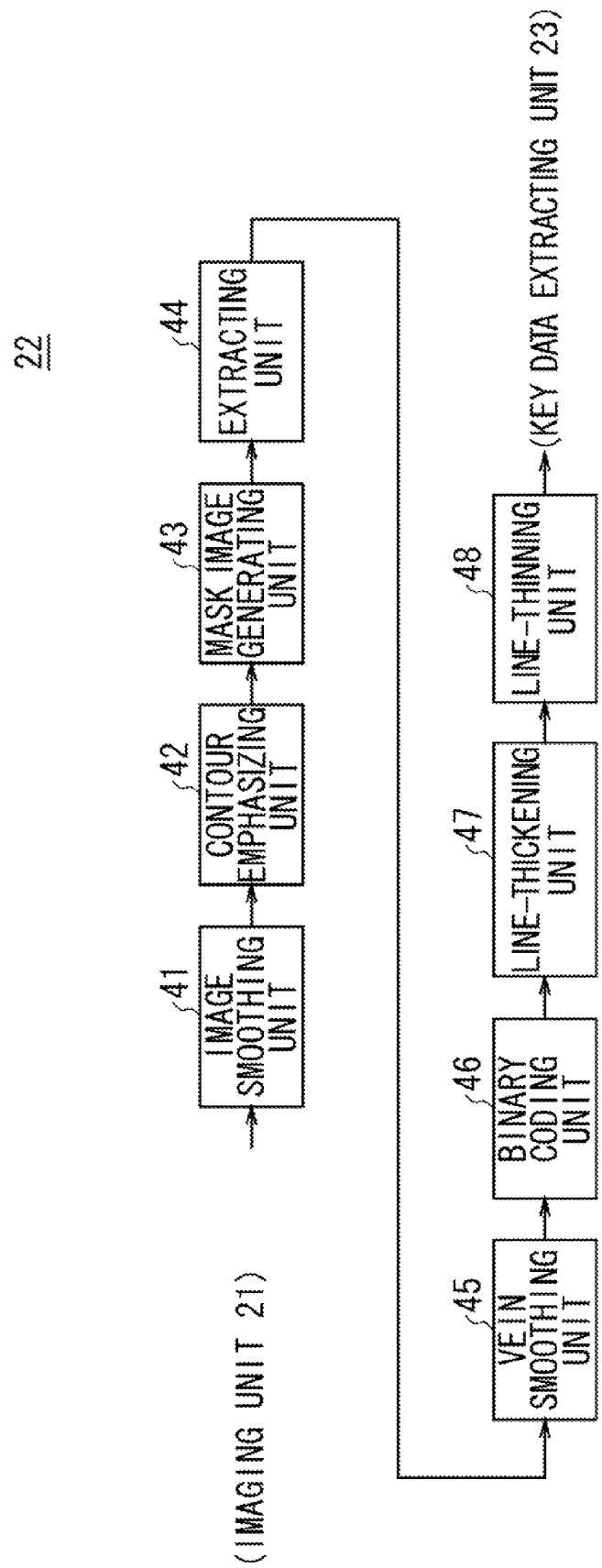
FIG. 4 is a block diagram showing the configuration of the vein data extracting unit.

The configuration of the vein data extracting unit 22 will be described. As shown in FIG. 4, the vein data extracting unit 22 includes an image smoothing unit 41, a contour emphasizing unit 42, a mask image generating unit 43, an extracting unit 44, a vein smoothing unit 45, a binary coding unit 46, a line-thickening unit 47, and a line-thinning unit 48.

The image smoothing unit 41 has a spatial filter such as Gaussian filter. The spatial filer performs filtering on the vein image represented by the video data generated in the embodiments described above and supplied from the imaging control unit 21. The vein image is thereby rendered smooth.

The contour extracting unit 32 has a spatial filter such as Laplacian of Gaussian (Log) filter. This spatial filter performs filtering on the vein image smoothed by the image smoothing unit 41, emphasizing the contour of the vein image.

The mask image generating unit 43 detects the contour of the finger from the vein image having the contour emphasized by the contour extracting unit 32, in accordance with the contrast the vein image has with respect to the background image. The mask image generating unit 43 generates binary data representing the finger region defined by the finger contour and the region lying outside the finger region. (Hereinafter, the image represented by the binary data will be referred to as "mask image.")

The extracting unit 44 uses the mask image generated by the mask image generating unit 43, extracting an image of a preset size from the vein image whose contour has been emphasized by the contour extracting unit 32.

The vein smoothing unit 45 has a spatial filter such as a median filter. This spatial filter performs filtering on the vein image extracted by the extracting unit 44, smoothing the images of veins in the vein image.

Figure 5A:
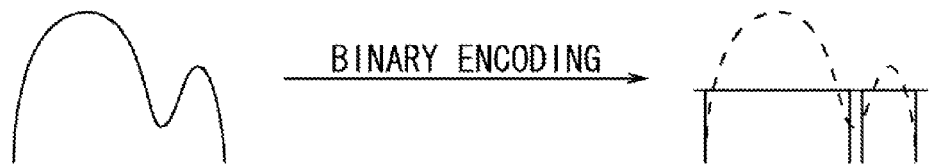
FIGS. 5A and 5B are diagrams explaining how the luminance changes in the process of extracting vein data.
Figure 5B:
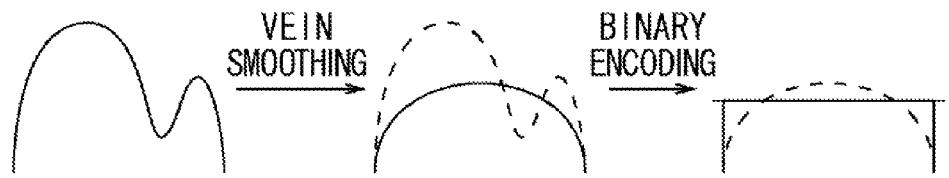

The binary coding unit 46 converts the vein image showing the veins thus smoothed by the vein smoothing unit 45, to a binary image, using a preset luminance as a threshold. Assume that the vein image showing veins not smoothed yet is converted to a binary image. Then, as shown in FIG. 5A, the image of each vein probably split into two veins at high probability. Hence, binary data representing an image similar to the actual veins can be obtained as shown in FIG. 5B.

The line-thickening unit 47 has a spatial filter such as a dilation filter. The dilation filter performs filtering on the binary vein video data generated by the binary coding unit 46, increasing the thickness of the veins in the vein image. As a result, the veins are coupled, representing thicker veins.

The line-thinning unit 48 has a spatial filer such as an erosion filter. The erosion filter performs filtering on the thick vein image formed by the line-thickening unit 47, making the thickness of the veins to a fixed value.

Thus, the vein data extracting unit 22 extracts, as vein data, the binary data that represents not only vein parts of the fixed thickness, but also the background part.

(1-3) Configuration of Key Data Extracting Unit

Figure 6:
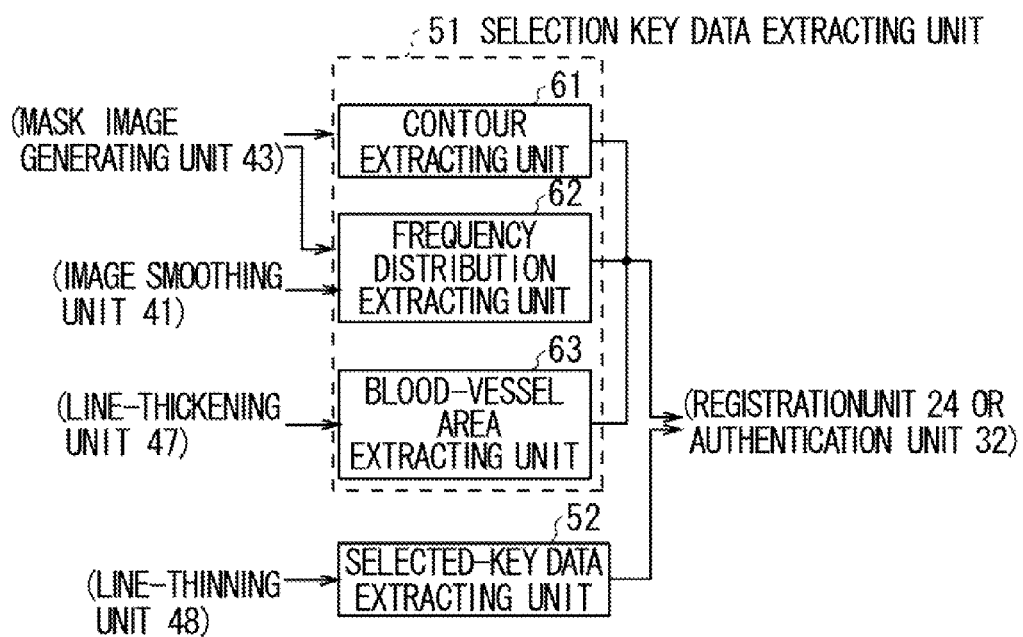
FIG. 6 is a block diagram showing the configuration of the key data extracting unit.

The configuration of the key data extracting unit 23 will be described. As shown in FIG. 6, the key data extracting unit 23 includes a selection key data extracting unit 51 and a selected-key data extracting unit 52.

The selection key data extracting unit 51 is a unit that extracts, as a key for selecting a collation candidate, the data representing the state of the video data generated at an intermediate stage of the process the vein data extracting unit 22 performs. (Hereinafter, this data will also be referred to as "selection key data.") The selection key data extracting unit 51 has a contour extracting unit 61, a frequency distribution extracting unit 62, and a blood-vessel area extracting unit 63.

Using the vein image generated at the time of removing noise components from the image, the contour extracting unit 61 extracts the selection key data that represents the contour of the finger.

Figure 7A:
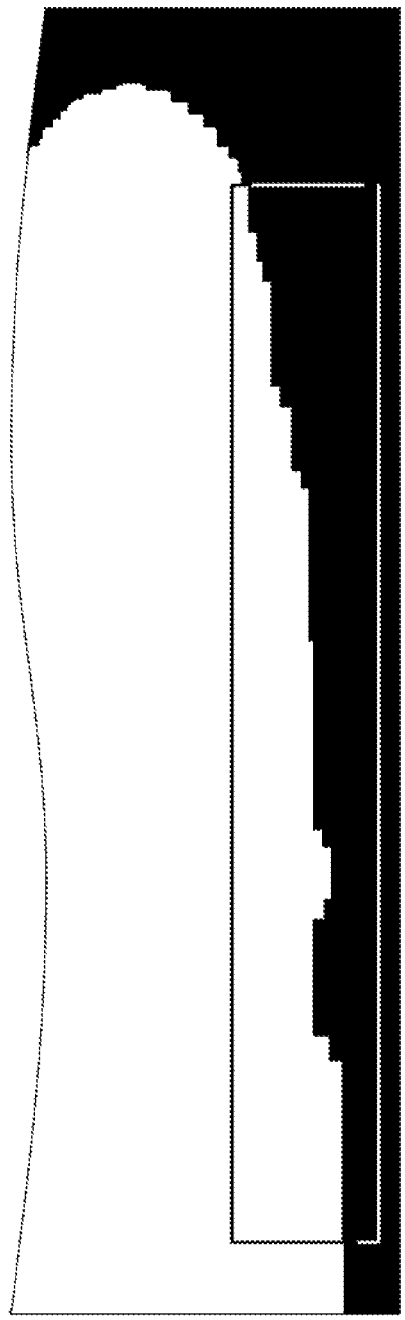
FIGS. 7A to 7D are schematic diagrams explaining how to extract data representing the contour of the finger.
Figure 7B:

A concrete example of extracting technique will be explained. First, the contour extracting unit 61 acquires a mask image (FIG. 7A) from the mask image generating unit 43. Then, the unit 61 extracts a specific region (FIG. 7B) of the mask image, which represents the contour of the finger (i.e., pixels defining the finger contour).

Figure 7C:
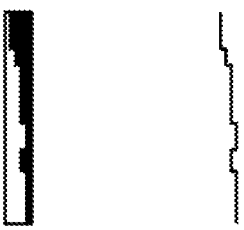
Figure 7D:

The contour extracting unit 61 compresses the specific region (FIG. 7B) in vertical and horizontal directions, to one nth of the original size (FIG. 7C). The unit 61 then determines the position of the finger contour (i.e., finger contour defined by pixels) that is contained in the specific region compressed (FIG. 7C). The position thus determined is a coordinate (x-coordinate) that represents the distance measured from a reference line (i.e., left edge) and defined by the number of pixels constituting a row or a column (FIG. 7D).

In this extracting technique, the coordinate value (x-coordinate) that represents the distance from a reference line (i.e., left edge) and is defined by the number of pixels constituting a row or a column is used as the above-mentioned selection key data. Therefore, the data representing the state (shape) of the finger contour can be smaller than in the case where the selection key data is composed of the x-y coordinates of the pixels constituting the finger contour.

Assume that the specific region to extract from the mask image is composed 240×30 pixels and that this region is compressed to one fifth of the original size. Then, in the compressed region composed of 48×6 pixels, the position (coordinate value) the finger contour takes with respect to the reference line is "48×1." In this case, the selection key data is composed of 24 bytes.

The frequency distribution extracting unit 62 extracts selection key data by using the vein image generated at the time of removing noise components from the image. The selection key data thus extracted represents the frequency distribution of the finger region defined by the finger contour.

A concrete example of extracting technique will be explained. The frequency distribution extracting unit 62 acquires a vein image smoothed by the image smoothing unit 41. The unit 62 also acquires a mask image from the mask image generating unit 43.

The frequency distribution extracting unit 62 uses the mask image, recognizing the finger region from the specific region in the smoothed vein image (FIG. 8A). Further, the unit 62 extracts pixels from the finger region and classifies the pixels into groups, each composed of pixels of the same luminance level (see FIG. 8B).

In this extracting technique, a luminance histogram of the finger region in the smoothed vein image is used as selection key data. Hence, the finger region can be represented by smaller data than in the case where the finger region per se is used as selection key data. Note that the selection key data is composed of 16 bytes, if the pixels are classified into 16 bins, each assigned to a luminance level.

Moreover, in this extracting technique, the image to be extracted is a vein image smoothed by the image smoothing unit 41. Therefore, the finger region is less controlled in terms of luminance than in the case where the vein image is extracted after it has been supplied from the image smoothing unit 41 and then processed by the contour emphasizing unit 42 or by the vein smoothing unit 45. The vein image can be extracted as selection key data that exhibits conspicuous characteristics.

The blood-vessel area extracting unit 63 extracts the selection key data representing the area in the finger region defined by the finger contour, by using the vein image represented by binary data and generated at a stage of the process of thickening the veins. A concrete example of this extracting technique will be explained. First, the blood-vessel area extracting unit 63 acquires the binary data representing a vein image of veins thickened, from the line-thickening unit 47. Then, the unit 63 extracts selection key data representing the number of pixels defining the veins (blood-vessel area) from the vein image.

Thus, in this extracting technique, the blood-vessel area in the image of thickened veins, represented by binary data, is used as image from which to determine the blood-vessel area. Therefore, the state of the finger region can be represented by a smaller amount of data than in the case where the blood vessels per se are used as selection key data. Note that the selection key data is composed of two bytes.

As stated above, the binary image of thickened veins is used in this extracting technique, as an image from which to extract the blood-vessel area. The boundary between any blood vessel and any other part is therefore more distinct than in the case where the blood-vessel area is extracted from, for example, a multi-value vein image. As a result, the blood-vessel area can be extracted under a specific condition. FIG. 9A shows an image of thickened veins, which is represented by binary data. This image shows the condition of the blood vessels more faithfully than such a vein image as shown in FIG. 9B, which is obtained by performing a line-thinning process on the binary data. The image of FIG. 9A can therefore be extracted as selection key data that exhibits conspicuous characteristics of the veins.

The selection key data extracted by the selection key data extracting unit 51 is composed of a 24-byte block, a 16-byte block and a 2-byte block, totaling 42 bytes. Even if 48 types of vein data items are registered, the selection key data registered in the storage unit 13 in association with the vein data falls within one kbyte. The selection key data therefore occupies, but an extremely small area in the storage unit 13.

The selected-key data extracting unit 52 is a unit that extracts the data (hereinafter called "selected key data") representing the state of the vein image output from the vein data extracting unit 22 to be registered. The fixed key data will be used as a key for determining a collation candidate.

More precisely, the selected-key data extracting unit 52 first extracts from the line-thinning unit 48 a vein image represented by binary data including a vein part and a background part, the vein part being a part to register and having a fixed vein width. The unit 52 then compresses the vein image to one nth (1/n) of the original size, generating a compressed image (hereinafter called "thumbnail image"). That is, the unit 52 extracts a thumbnail image as selected key data.

The selected key data reflects the contents of the entire vein image that should be registered. Therefore, the selected key data is key data that represents the veins more in detail than the selected key data extracted by the image smoothing unit 41, contour emphasizing unit 42 or mask image generating unit 43.

(1-4) Configuration of Authentication Unit

Figure 10:
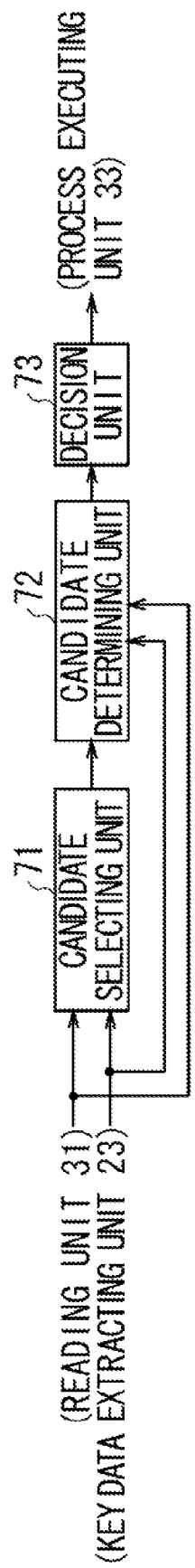
FIG. 10 is a block diagram showing the configuration (1) of the authentication unit.

The configuration of the authentication unit 32 will be described. As shown in FIG. 10, the authentication unit 32 includes a candidate selecting unit 71, a candidate determining unit 72, and a decision unit 73.

The candidate selecting unit 71 compares the selection key data (i.e., the position of the finger contour (coordinate value), the number of pixels, each at a luminance level, and the number of pixels defining veins) read from the storage unit 13 by the reading unit 31 to be registered, with the selection key data (i.e., the coordinate value of the finger contour, the number of pixels, each at a luminance level, and the number of pixels defining veins) extracted by the key data extracting unit 23 to be authenticated.

The candidate selecting unit 71 compares these selection key data items in terms of the number of pixels, each at a luminance level. First, the unit 71 finds a difference between the selection key data to be registered (more precisely, the coordinate value of finger contour) and the selection key data to be authenticated (more precisely, the coordinate value of finger contour), in units of rows (or columns). Then, the unit 71 adds the absolute values of the differences found in units of rows (or columns). The smaller the resultant sum is, the more similar the finger contours represented by the selection key data items will be. The sum of the absolute values will be referred to as "finger-contour difference value."

Further, the candidate selecting unit 71 compares these selection key data items in terms of the number of pixels, each at a luminance level. That is, the unit 71 compares the selection key data to be registered (more precisely, the number of pixels of each group, which are at a luminance level) and the selection key data to be authenticated (more precisely, the number of pixels of each group, which are at a luminance level). Then, the unit 71 selects the smaller of every two numbers of pixels compared, and adds the numbers of pixels, thus selected. The greater the resultant sum is, the more similar the finger regions represented by the selection key data items will be. The sum of the numbers of pixels will be referred to as "finger region difference value."

Moreover, the candidate selecting unit 71 compares these selection key data items in terms of the number of pixels defining veins. First, the unit 71 finds a difference between the selection key data to be registered (more precisely, the number of pixels defining veins) and the selection key data to be authenticated (more precisely, the number of pixels defining veins) extracted by the selection key data extracting unit 51. The smaller the difference thus obtained, the larger the area the veins occupy in the finger region. This difference will be referred to as "blood vessel difference value."

Thus, the candidate selecting unit 71 obtains a finger-contour difference value S, a finger region difference value H, and a blood vessel difference value D. Two threshold values are set for the finger-contour difference value S, i.e., first threshold value T1 and second threshold value T2. Also, one threshold value is set for the blood vessel difference value D, i.e., third threshold value T3. Then:

$$ES = \frac{S}{T1} \quad (1)$$

$$EH = \frac{H}{T2}$$

$$ED = \frac{D}{T3}$$

Thus, the ratio ES of finger-contour difference value S to the first threshold value T1, the ratio EH of finger region difference value H to the second threshold value T2, and the ratio ED of blood vessel difference value D to the third threshold value T3 are calculated, setting the finger-contour difference value, finger region difference value and blood vessel difference value within constant ranges (or normalizing these three values).

Then, the candidate selecting unit 71 performs the following calculation:

$$E = ES + ED - EH \quad (2)$$

That is, the candidate selecting unit 71 subtracts the ratio EH of finger region difference value H to the second threshold value T2 from the sum of the ratio ES of finger-contour difference value S to the first threshold value T1 and the ratio ED of blood vessel difference value D to the third threshold value T3. The unit 71 thereby generates an evaluation value E. The smaller the finger-contour difference value S and the blood vessel difference value D are, or the larger the finger region difference value H is, the higher the similarity will be. Hence, the smaller the evaluation value E is, the more probably the registrant will be authenticated.

Thus, the candidate selecting unit 71 detects the selection key data having an evaluation value smaller than the fourth threshold value set for the evaluation value E, and selects the vein data to register and associated with the selection key data detected, as a collation candidate that will be collated with the vein data that should be authenticated.

The candidate selecting unit 71 compares the number of collation candidates thus far selected, with a preset number of collation candidates (hereinafter referred to as "preset number of candidates"). If the number of collation candidates selected is equal to or greater than the preset number of candidates, the collation candidates selected will be collated in the descending order of evaluation value E.

Assume that the number of collation candidates selected is smaller than the preset number of candidates. Then, the vein data items selected as collation candidates to register may include a data item either identical, or considered to be identical, to the vein data to be authenticated. In this case, the candidate selecting unit 71 selects again the preset number of candidates in the descending order of evaluation value E, and sets an order in which to collate the collation candidates thus selected.

That is, the candidate selecting unit 71 is designed to select vein data items and to set the order in which to collate these vein data items, as candidates, with the vein data that should be authenticated, by using the similarity of a part (i.e., finger contour, finger region, or vein part) of the image extracted to be registered or authenticated, as reference for selecting the collation candidates, and to set the order in which to collate the collation candidates selected.

If the number of collation candidates is smaller than the preset number of candidates, the candidate selecting unit 71 selects the vein data items in the descending order of similarity, no matter whether the collation candidates have similarity (in terms of shape, luminance, number of vein pixels) lower than a preset level (i.e., fourth threshold value). This increases the chance of a selecting collation candidate identical or considered to be identical to the vein data to be authenticated.

Note that the vein contour varies, depending on how much the finger tip is bent or how thick the finger is. Therefore, the candidate selecting unit 71 excludes, as collation candidates, the vein data items which differ in terms of the type of the finger authenticated and the growth of finger.

The luminance of the finger region varies from person to person, in accordance with the thickness of the finger, the race of the registrant, such as Black or Caucasian. This is why the candidate selecting unit 71 roughly excludes, as collation candidates, the vein data items which differ in the type of the finger authenticated and the growth of finger, in accordance with the luminance of the finger region.

Further, the blood-vessel area differs from person to person, in accordance with, for example, sex, fat content or finger thickness. Therefore, the candidate selecting unit 71 roughly excludes, as collation candidates, the vein data items which differ in the type of the finger authenticated and the sex of the registrant.

The candidate determining unit 72 determines one collation candidate, or selects one of the collation candidates selected by the candidate selecting unit 71 in numbers equal to or larger than the preset number, by using the fixed key data (thumbnail image) associated with the vein data of the collation candidate to be registered and the fixed key data (thumbnail image) to be authenticated, which has been extracted by the key data extracting unit 23.

More specifically, the candidate determining unit 72 causes the reading unit 31 to read the fixed key data items to be registered, in the order set by the candidate selecting unit 71. Every time the reading unit 31 reads fixed key data (thumbnail image), the unit 72 collates the fixed key data with the fixed key data item (thumbnail images) to be authenticated. In this process of collating a fixed key data (thumbnail image) with the fixed key data item to be authenticated, the similarity (or degree of difference) of the fixed data is determined in the form of, for example, a mutual collation function, a phase collation function, or a sum of absolute difference (SAD).

The result of the collation of the fixed key data items (thumbnail images) compared with each other, one to be registered and the other to be authenticated, may be equal to or greater than the fifth threshold value set for this result. If this is the case, the candidate determining unit 72 determines the vein data to be registered and associated with the thumbnail image, as a collation candidate of the vein data that should be authenticated.

That is, the candidate determining unit 72 is configured to determine the vein data as a candidate to collate with the vein data to be authenticated, by using, as collation-candidate determining reference, the similarity of the fixed key data (thumbnail image) acquired from the vein data extracted at the time registration and authentication and representing the veins more in detail than the selected key data.

The decision unit 73 collates the vein data the candidate determining unit 72 has determined as a collation candidate, with the vein data the vein data extracting unit 22 has extracted as vein data to be authenticated. Based on the result of this collation, the decision unit 73 determines whether the user is an authenticated registrant or not. In this collation of the vein data items, reference data identical to the fixed key data (thumbnail image) or any other data may be used.

(1-5) Sequence of Authentication Process

Figure 11:
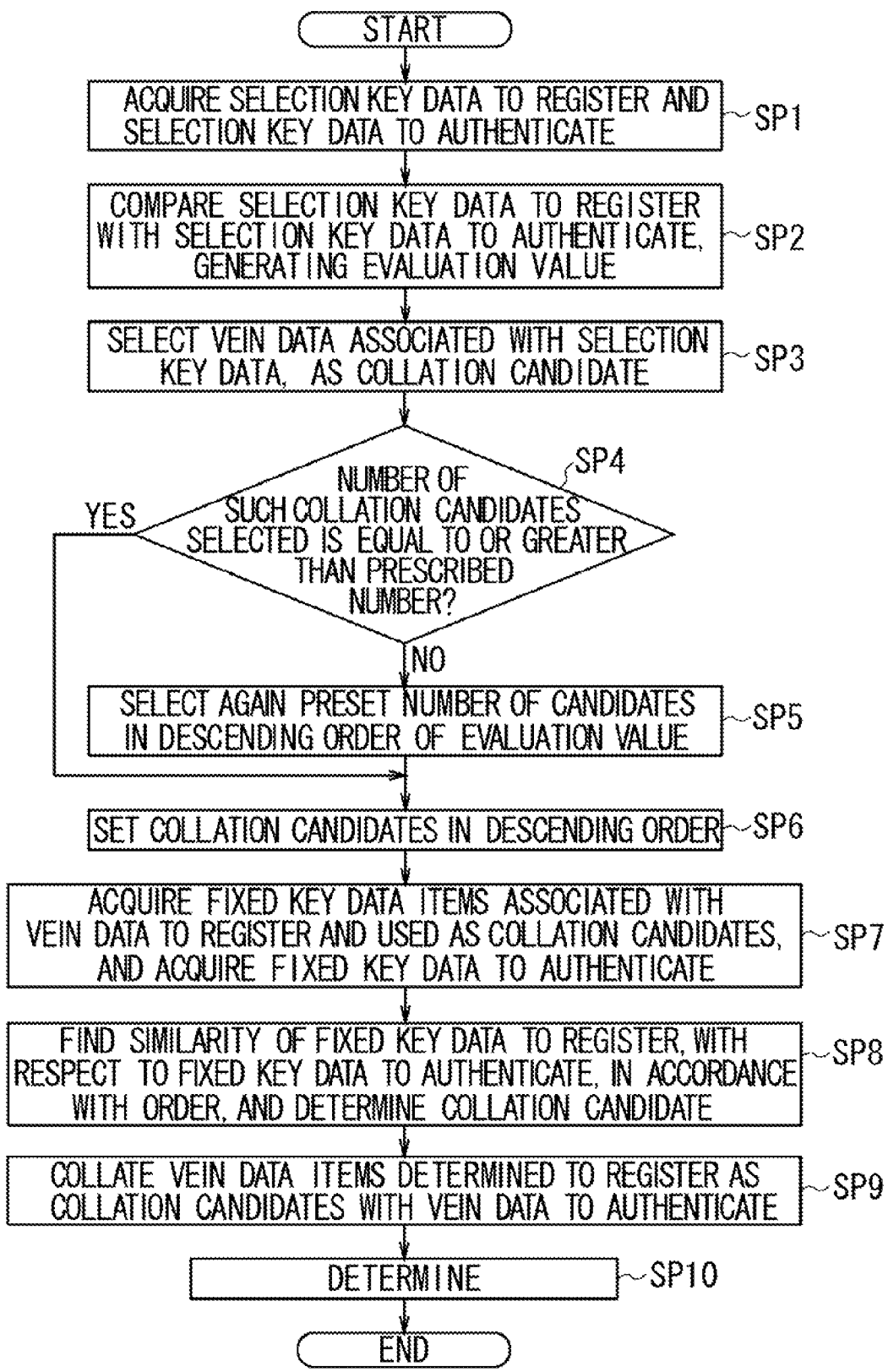
FIG. 11 is a flowchart illustrating the sequence of the authentication process.

The sequence of the authentication process the authentication unit 32 performs will be explained. As shown in FIG. 11, the authentication unit 32 starts performing the authentication process when the authentication apparatus 1 is set to the authentication mode. In Step SP1, the authentication unit 32 acquires selection key data to register and selection key data to authenticate. The process then goes to Step SP2.

In Step SP2, the authentication unit 32 compares the selection key data to register with the selection key data to authenticate, generating an evaluation value. The authentication unit 32 generates the evaluation value indicating that the smaller the difference between the selection key data items compared, the more greatly the selection key data items are evaluated as collation candidates. Then, the process goes to Step SP3.

In Step SP3, the authentication unit 32 detects selection key data to register, which has an evaluation value smaller than a prescribed value, and selects the vein data associated with the selection key data thus detected, as a collation candidate to be collated with the vein data that should be authenticated. The process then goes to Step SP4, in which the authentication unit 32 determines whether the number of such collation candidates selected is equal to or greater than a prescribed number (preset candidate number).

The number of collation candidates selected may be equal to or greater than the preset candidate number. In this case, the authentication unit 32 determines that the vein data items selected as collation candidates to register may include a data item either identical, or considered to be identical, to the vein data to be authenticated with high possibility. In this case, the process goes to Step SP5. In Step SP5, the selecting unit 71 selects again the preset candidate number in the descending order of evaluation value. The authentication unit 32 goes to Step SP6, skipping Step SP5.

The number of collation candidates selected may be smaller than the preset candidate number. In this case, the authentication unit 32 determines that the vein data items selected as collation candidates to register may not include a data item either identical, or considered to be identical, to the vein data to be authenticated. If this is the case, the process goes to Step SP5. In Step SP5, the selecting unit 71 selects again the preset number of candidates in the descending order of evaluation value. The authentication unit 32 then goes to Step SP6.

In Step SP6, the authentication unit 32 sets the collation candidates generated in Step SP2, in descending order. In Step SP7, the authentication unit 32 acquires fixed key data items associated with the vein data to register and used as collation candidates, and acquires fixed key data to authenticate.

The authentication unit 32 then goes to Step SP8 and collates the fixed key data with the fixed key data items to authenticate in the order set in Step SP6. Thus, the authentication unit 32 determines, as a collation candidate, the vein data item associated with the fixed key data which should be registered and which represents similarity equal to or higher than a preset value, with respect to the fixed key data to authenticate.

In Step SP9, the authentication unit 32 collates the vein data items to register determined as collation candidates with the vein data to authenticate. In Step SP10, the authentication unit 32 determines whether the user is an authenticated registrant or not. Then, the unit 32 terminates the authentication process.

Thus, the authentication unit 32 is configured to use the selection key data, reducing the number of collation candidates, and then to use the fixed key data more minute than the selection key data, further reducing the number of collation candidates.

(1-6) Operation and Effect

The authentication apparatus 1 having the configuration described above extracts key data representing the position the finger contour takes at an intermediate stage of the process of extracting the vein data to register, and stores the key data in the reading unit 31, in association with the vein data.

The authentication apparatus 1 further extracts key data representing the position the finger contour takes at an intermediate stage of the process of extracting the vein data to register to authenticate. The apparatus 1 then determines one of the vein data items to register, as a candidate to collate with the vein data to authenticate, in accordance with the similarity with the key data registered in the storage unit 13.

Thus, in the authentication apparatus 1, the position the finger contour takes at an intermediate stage of the process of extracting the vein data is an element that determines the collation candidate. The authentication apparatus 1 can therefore determine the collation candidate during the process of extracting the vein data to authenticate. Thus the authentication apparatus 1 can authenticate the user at high speed. Since the data representing the position of the finger contour pertains to the elements of a living body, not containing pseudo elements such as Huff-transform images. This minimizes the possibility that the collation candidates include no registered images of the registrant. The authentication apparatus 1 can therefore authenticate the user at high speed.

In the authentication apparatus 1, the positions of the pixels which are spaced at regular intervals (FIG. 7C) among the pixels defining the finger contour are extracted from the specific region of an image generated at an intermediate stage of the process of extracting the vein data as finger-contour position data.

The authentication apparatus 1 can therefore display the finger contour with a smaller amount of data than in the case where the positions of the pixels (FIG. 7B) are used as data representing the finger contour. As a result, the area the data occupies in the storage unit 13 can be reduced. At the same time, the load of determining the similarity of the finger-contour position data can be reduced.

In the authentication apparatus 1, the positions of the pixels spaced at regular intervals are defined by the coordinate value (x-coordinates) that represents the distance from a reference line (i.e., left edge, not the x-coordinates and y-coordinates (see FIG. 7D). Further, small amount of data can therefore define the finger contour.

In the authentication apparatus 1, the image generated at the stage of removing noise components from the image showing veins in the finger (or generated in the image smoothing unit 41) is used as image from which to extract the data representing the position of the finger contour. The finger contour can therefore be extracted more accurately from the image that is free of pseudo elements resulting from instantaneous changes in, for example, the imaging conditions. This further reduces the possibility that the collation candidates include no registered images of the registrant.

In the authentication apparatus 1, not only the data representing the finger contour, but also the data representing the frequency distribution of the finger region defined by the finger contour and the data representing the vein area in the region defined by the finger contour are extracted. Therefore, the authentication apparatus 1 can detect the characteristics of the living body from various points of view. Thus, even if the data representing each characteristic is small in amount, the probability that none of the collation candidates include the registered image of the registrant can be reduced far more readily than in the case where the data represents only the finger contour.

Figure 12A:
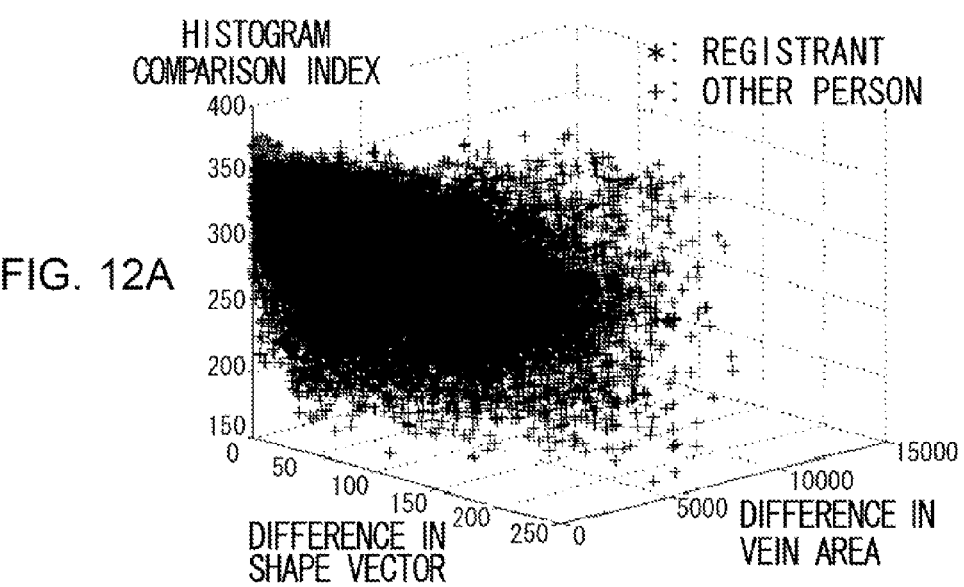
FIGS. 12A and 12B are schematic diagrams representing experimental results.
Figure 12B:
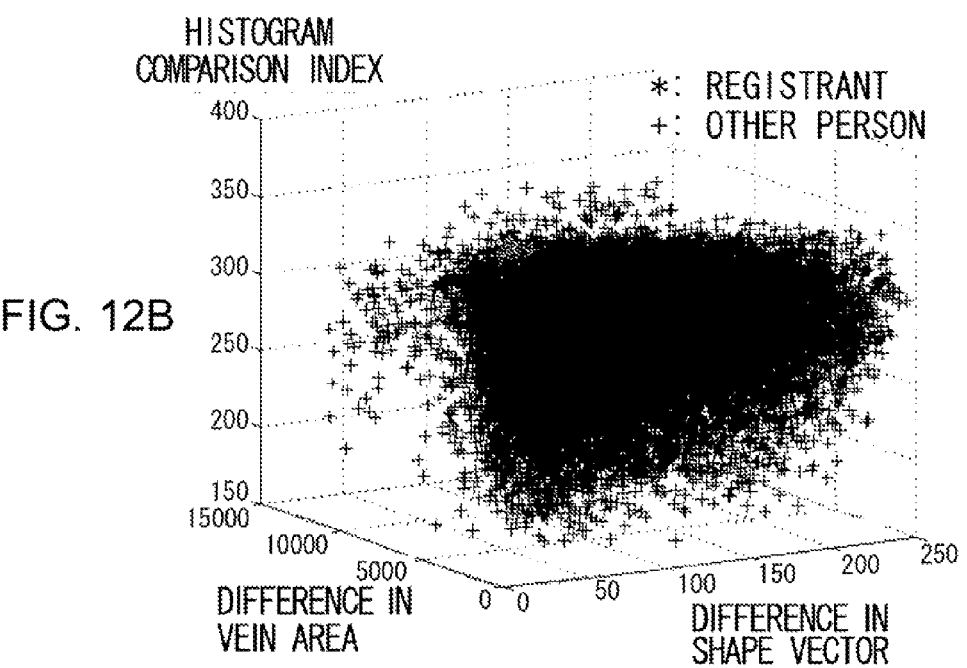

FIGS. 12A and 12B are graphs showing the results of an experiment, in which vein images (200 images) of 50 persons were registered. In these graphs, the data representing the finger contour, the data representing the frequency distribution of the finger region defined by the finger contour and the data representing the vein area in the region defined by the finger contour, for each person, are three-dimensionally plotted. As seen from FIGS. 12A and 12B, the gray marks (pertaining to one person) lie at the corners of the group of black marks (pertaining to another persons). This indicates that the probability that none of the collation candidates include the registered image of the registrant is extremely low.

In the authentication apparatus 1, the similarity between the three data items, respectively representing the finger contour, the frequency distribution of the finger region defined by the finger contour and the vein area in the region defined by the finger contour, is obtained by subtracting the ratio EH of finger region difference value H to the second threshold value T2 from the sum of the ratio ES of finger-contour difference value S to the first threshold value T1 and the ratio ED of blood vessel difference value D to the third threshold value T3, as been from the equations (1) and (2).

Hence, in the authentication apparatus 1, the similarity can be calculated by performing simple operations such as addition and subtraction, not by performing complicated statistical operations using dispersion and standard deviation in order to attain correlation coefficients. As a result, the authentication can be achieved even faster than otherwise.

Further, in the authentication apparatus 1, collation candidates are selected in accordance with the similarity between selection key data items (i.e., the finger contour, the frequency distribution of the finger region defined by the finger contour, and the vein area in the region defined by the finger contour). Then, one of the selected collation candidates is determined is selected in accordance with the similarity of the fixed key data (thumbnail image) that is larger in amount than the selection key data.

Thus, the number of collation candidates is first reduced and then further minutely reduced in the authentication apparatus 1. The authentication apparatus 1 can therefore authenticate any registrant at higher speed than in the case where a collation candidate is determined from only the selection key data or the fixed key data, and can yet minimize the possibility that the collation candidates include no registered images of the registrant.

The time required to calculate the similarity of the selection key data was 0.01 msec or less for one vein image on MATLAB7.4.0. When every fourth image (N/4) was selected as a collation candidate from N images, and every second (N/8) of the images thus selected was selected as a collation candidate, the time required to calculate the similarity was 3 msec on MATLAB7.4.0. The time required to collate the candidate thus determined with the vein data to authenticate and to determine whether the user is an authenticated registrant was 10 msec on MATLAB7.4.0.

Thus, the average time for the above-mentioned authentication is theoretically 0.01·N msec+3N/8 msec+10 msec, or 0.3651N+10 msec. On the other hand, the average time for the authentication in which a collation candidate is determined from only the fixed key data (thumbnail image), not using the selected key data, is 1.5N+10 msec.

That is, if some collation candidates are first selected by using the selection key data and then further selected by using the fixed key, the authentication can be achieved about four times faster than in the case where a collation candidate is determined from the fixed key data only.

In the authentication apparatus 1 so configured as described above, a collation candidate is selected in accordance with the finger contour extracted at an intermediate stage of the process of extracting the vein data. That is, the collation candidate can be selected while the vein data to be authenticated is being extracted. This reduces the probability that none of the collation candidates include the registered image of the registrant, more than in the case where data containing pseudo elements is used to select a collation candidate. The authentication apparatus 1 can thus authenticate the registrant at high speed.

(2) Second Embodiment (2-1) Outer Appearance of Cellular Phone

Figure 13:
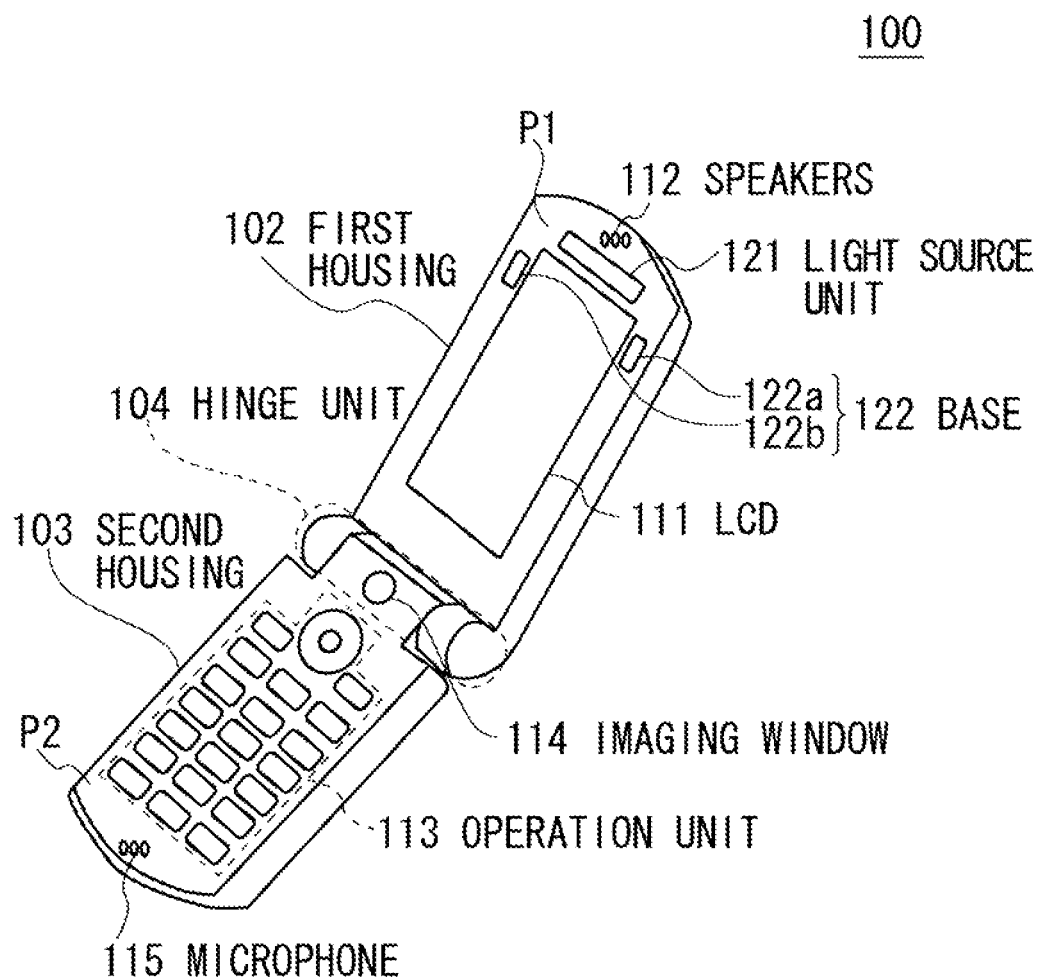
FIG. 13 is a schematic diagram showing the outer appearance of a cellular telephone.

FIG. 13 shows the outer appearance of a cellular telephone 100 according to a second embodiment of this invention. The cellular telephone 100 includes a first housing 102, a second housing 103, and a hinge unit 104. The first housing 102 and second housing 103 have substantially a rectangular parallelepiped shape.

A liquid crystal display (LCD) 111 is provided on the center part of one surface P1 of the first housing 102. A speaker 112 is provided in that part of the surface P1 which opposes the channel-shaped part of the surface P1.

The second housing 103 has a surface P2. On the center part of the surface P2, an operation unit 113 is provided. The operation unit 113 has a power key, a call key, menu keys, and character keys. The projecting part of the surface P2, which lies in the channel-shaped part of the surface P1 of the first housing 102, has an imaging window 114. A microphone 115 is provided in that end of the surface P2, which opposes the projecting part.

Figure 14:
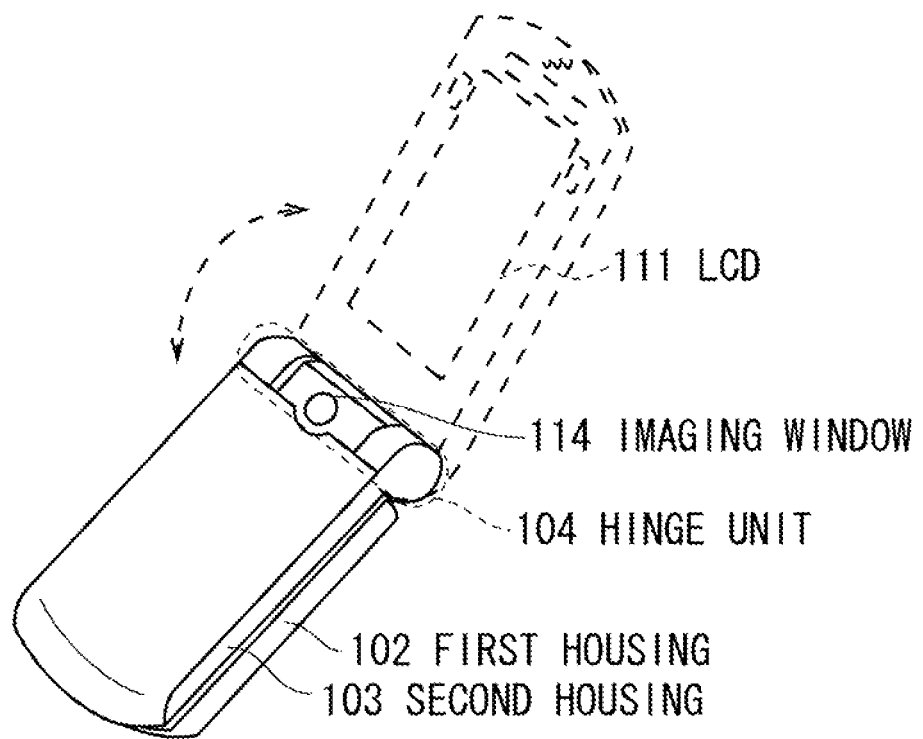
FIG. 14 is a schematic diagram showing the movable range of the cellular telephone.

The hinge unit 104 has an axle that penetrates the channel-shaped part of the first housing 102 and the projecting part of the second housing 103. Around the axle, the first housing 102 or the second housing 103 can rotate, as shown in FIG. 14, between a position (hereinafter called "closed position") where the surfaces P1 and P2 oppose each other and an opened position (hereinafter called "opened position") where the surfaces P1 and P2 define a predetermined angle between then.

The cellular telephone 100 is so designed that the projecting part of the second housing 103 remains exposed while the cellular telephone 100 stays in not only the closed position, but also the opened position. An object can therefore be imaged through the imaging window 114 no matter whether the cellular telephone 100 is in the closed position or the opened position.

Moreover, the cellular telephone 100 is so configured that the light reflected by the blood vessels in the finger placed at a specified position on the first housing 102 passes through the imaging window 114. That is, a light source unit 121 is arranged between the upper edge of the LCD 111 and a speaker 112, and a pair of bases 122 (bases 122a and 122b), either shaped like a thin plate, are provided on the sides of an upper part of the LCD 111, respectively.

Figure 15:
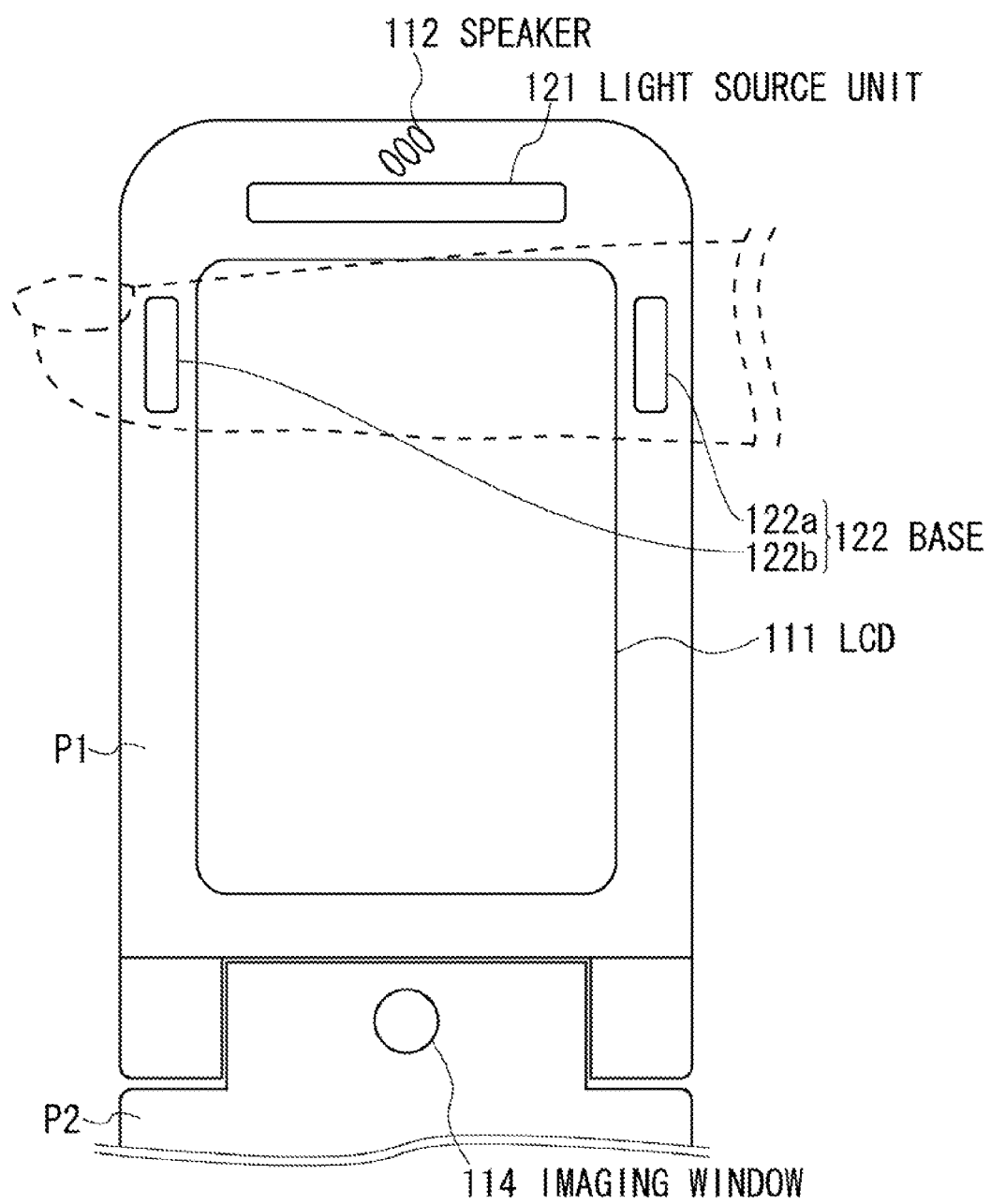
FIG. 15 is a diagram explaining how the user should place the finger, positioning the same with respect to the light source and base of the cellular telephone when the upper edge of an LCD is used as a reference.

This arrangement of the bases 122a and 122b and the positional relation the bases 122 have with the light source unit 121 enable the user to understand that he or she should place his or her finger on the display screen, not on the speaker 112 as shown in FIG. 15. In addition, the bases 122 prevent the user's finger from contacting the display screen of the LCD 111, ultimately preventing dirt, such as sweat, from sticking to the display screen.

Figure 16:
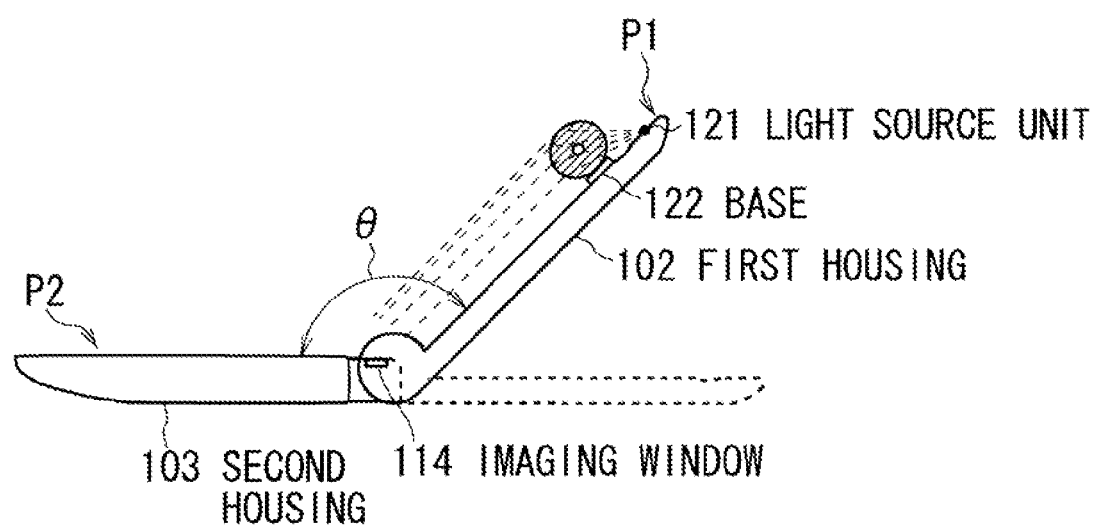
FIG. 16 is a diagram explaining how the veins are imaged with the cellular telephone.

Assume that the user places his or her finger at the specified position on the first housing 102 while the first housing 102 remains in the opened position as shown in FIG. 16. Then, the near infrared light emitted from the light source unit 121 passes through the vein layer in the finger, reaching the layer behind the vein layer. In the finger, the light is scattered and reflected. The light reflected or scattered emerges from the finger.

That part of the near infrared light emerging from the finger, which travels parallel or substantially parallel to the surface P1 of the first housing 102, passes through the imaging window 114. In the second housing 103, the near infrared light is guided by an optical system to a charge coupled device (CCD). That part of the near infrared light, which has passed through the non-vein parts in the finger (has not passed through the vein layer) form a bright image. On the other hand, the part of the near infrared light, which has passed through the vein parts in the finger (has passed through the vein layer), form a dark image because the hemoglobin absorbs light.

(2-2) Circuit Configuration of Cellular Telephone

Figure 17:
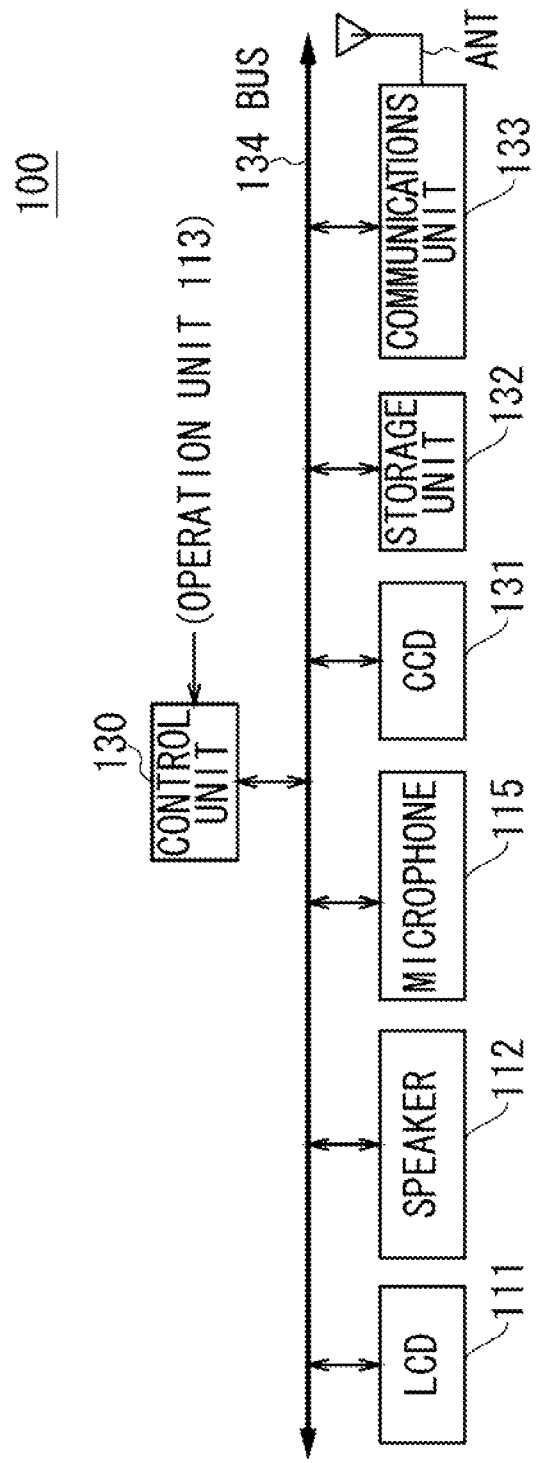
FIG. 17 is a block diagram showing the circuit configuration of the cellular telephone.

The circuit configuration of the cellular telephone 100 will be described. As shown in FIG. 17 in which some components are designated by the same reference numerals as in FIG. 13, an LCD 111, a speaker 112, a microphone 115, a CCD 131, a storage unit 132, and a communications unit 133 are connected to a control unit 130 via a bus 134.

The control unit 130 is a computer that includes a CPU, a ROM, and a RAM. The CPU controls the entire components of the cellular telephone 100. The RON stores various programs including an activation program. The RAM functions as a work memory for the CPU.

The control unit 130 can receive various instructions from the operation unit 113. The instructions include an instruction for executing the blood-vessel registration mode, an instruction for executing the authentication mode, an instruction for executing the electronic-mail preparation/transmission mode, and an instruction for executing the communication mode.

The control unit 130 determines the operating mode to execute, from the instruction it has received. In accordance with the program associated with the operating mode, the control unit 130 controls the LCD 111, speaker 112, microphone 115, CCD 131, storage unit 132 and communications unit 133, thereby to perform various processes.

The LCD 111 is configured to display on the display screen the content such as characters and figures, which is represented by the display data supplied from the control unit 130. The speaker 112 can generate a speech represented by the audio data supplied from the control unit 130. The microphone 115 catches a speech and converts the speech to audio data in a predetermined cycle. The audio data is output to the control unit 130.

The CCD 131 receives the light coming through the imaging window 114 (FIG. 13) and performs photoelectric conversion on the light at regular intervals. Thus, the CCD 131 converts the light to video data. The video data is sent to the control unit 130.

The storage unit 132 is provided to hold various data items, such as vein data, programs and setting data. The storage unit 132 is configured to store any data designated by the control unit 130. The data can be read from the storage unit 132.

The communications unit 133 receives various data items from the microphone 115 or the control unit 130. The unit 133 performs a specific modulation process on the data and amplifies the data, thereby generating a signal. The signal thus generated is transmitted, as an uplink signal, from the antenna ANT of the cellular telephone 100 to a base station (not shown).

The communications unit 133 receives a downlink signal transmitted from the base station (not shown) via the antenna ANT. The unit 133 amplifies the downlink signal and then performs a specific demodulation process on the downlink signal, generating data. This data is supplied to the speaker 112 or the control unit 130.

(2-2-1) Vein Registration Mode

The vein registration mode will be explained next. The control unit 130 may determine that the vein registration mode should be executed. In this case, the control unit 130 causes the LCD 111 or the speaker 112, or both, to tell the user to move the first and second housings 102 and 103 to the opened position (FIG. 16) and then place his or her finger on the display screen, stretching it along the upper edge of the LCD 111 (FIG. 15).

Figure 18:
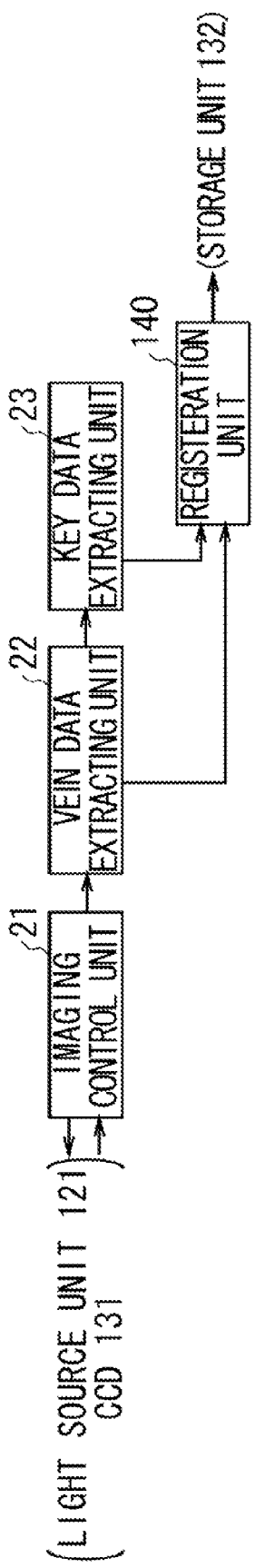
FIG. 18 is a block diagram showing the functional configuration (2) of the control unit working in the vein registration mode.
Figure 19:
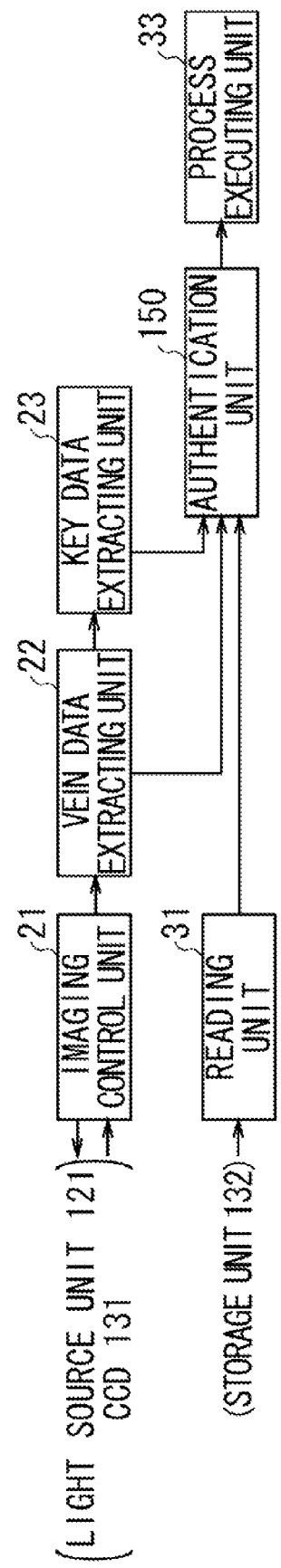
FIG. 19 is a block diagram showing the functional configuration (2) of the control unit working in the authentication mode.

Thereafter, the control unit 130 functions as an imaging control unit 21, a vein data extracting unit 22, a key data extracting unit 23, and a registration unit 140, as is illustrated in FIG. 18. The imaging control unit 21, vein data extracting unit 22 and key data extracting unit 23 are identical to those shown in FIG. 2. Therefore, only the registration unit 140 having different configuration as the registration unit 24 in the first embodiment will be described below.

The registration unit 140 determines whether the vein data is fit to register, from the amount of the vein data extracted by the vein data extracting unit 22 and the shape of the vein pattern. If the vein data is found fit to register, the registration unit 140 determines whether the number of vein data items the registrant should register has reached two or more.

If the vein data is not found fit to register or if the number of vein data items fit to register has not reached the preset value, the registration unit 140 notifies this fact through the LCD 111 or the speaker 112, or both.

If the number of vein data items fit to register has reached the preset value, the registration unit 140 stores, in the storage unit 132, the vein data items and key data items the key data extracting unit 23 has extracted from the image, with each vein data item in association with the key data item. (The set of each vein data item and the associated key data item will be called "registered set".)

The registration unit 140 thus stores each vein data item in association with a key data item. In view of this, the registration unit 140 differs from the registration unit 24 of the first embodiment, which registers the vein data about a finger and the key data about the finger.

(2-2-2) Authentication Mode

The authentication mode will be explained next. Once the cellular telephone has been set to the authentication mode, the control unit 130 instructs the LCD 111 or the speaker 112, or both, asking the registrant to move the first and second housings 102 and 103 to the opened position (FIG. 16) and to place his or her finger on the display screen, along the edge of the LCD 111 (FIG. 15).

If the storage unit 132 stores one registered set, the reading unit 31 supplies the vein data contained in the registered set to an authentication unit 150. The authentication unit 150 determines whether the user is the registrant, by using the vein data read by the redding unit 31, which should be registered, and the vein data extracted by the vein data extracting unit 22, which should be authenticated. (In other words, the authentication unit 150 determines whether the authentically has been successfully accomplished or not.)

On the other hand, if the storage unit 132 stores a plurality of registered sets, the reading unit 31 supplies the key data which is associated with the vein data contained in each registered set and which should be registered.

In this case, the authentication unit 150 selects, from the registered sets stored in the storage unit 132, the registered set that should be collated with the vein data which has been extracted by the vein data extracting unit 22 and which should be authenticated, based on the key data to register read by the reading unit 31 and the key data to authenticate extracted by the key data extracting unit 23.

The authentication unit 150 causes the reading unit 31 to read the vein data contained in the registered set determined to be a collation candidate. Using the vein data thus read and the vein data to authenticate extracted by the vein data extracting unit 22, the authentication unit 150 determines whether the user is the registrant or not. (That is, the unit 150 determines whether the authentication has been successfully accomplished or not.)

Thus, the authentication unit 150 determines collation candidates in accordance with the vein data units contained in registered sets. In this respect, the authentication unit 150 differs from the authentication unit 32 of the first embodiment, which determines collation candidates in accordance with the individual vein data items. The process the authentication unit 150 performs will be explained in following paragraph.

(2-3) Configuration of Authentication Unit

Figure 20:
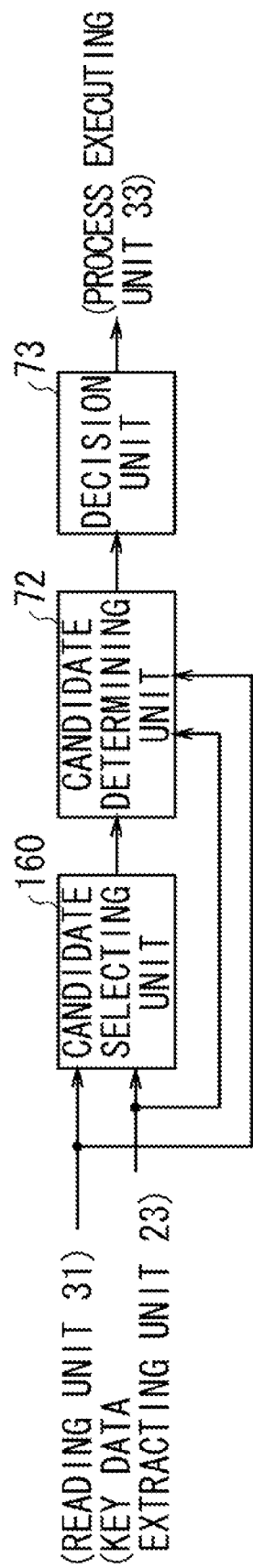
FIG. 20 is a block diagram showing the configuration (2) of the authentication unit.

The configuration of the authentication unit 150 will be described with reference to FIG. 20, in which the components identical to those shown in FIG. 10 are designated by the same reference numbers. As FIG. 10 shows, the authentication unit 150 includes a candidate selecting unit 160, a candidate determining unit 72, and a decision unit 73. Only the candidate selecting unit 160 having different configuration as the candidate selecting unit 71 in the first embodiment will be explained.

The candidate selecting unit 160 compares the selection key data (i.e., the position of the finger contour (coordinate value), the number of pixels of each luminance level, and the number of vein pixels) which has been read by the reading unit 31 from the storage unit 132 and which should be registered, with the selection key data (i.e., the position of the finger contour (coordinate value), the number of pixels of each luminance level, and the number of vein pixels) which has been extracted by the key data extracting unit 23 and which should be authenticated.

The candidate selecting unit 160 takes the lengthwise shift of the finger into consideration, in comparing the selection key data that indicates the coordinate value of the finger contour. In this respect, the candidate selecting unit 160 differs from the candidate selecting unit 71 of the first embodiment, which does not take the shifting of the finger into account at all.

Figure 21:
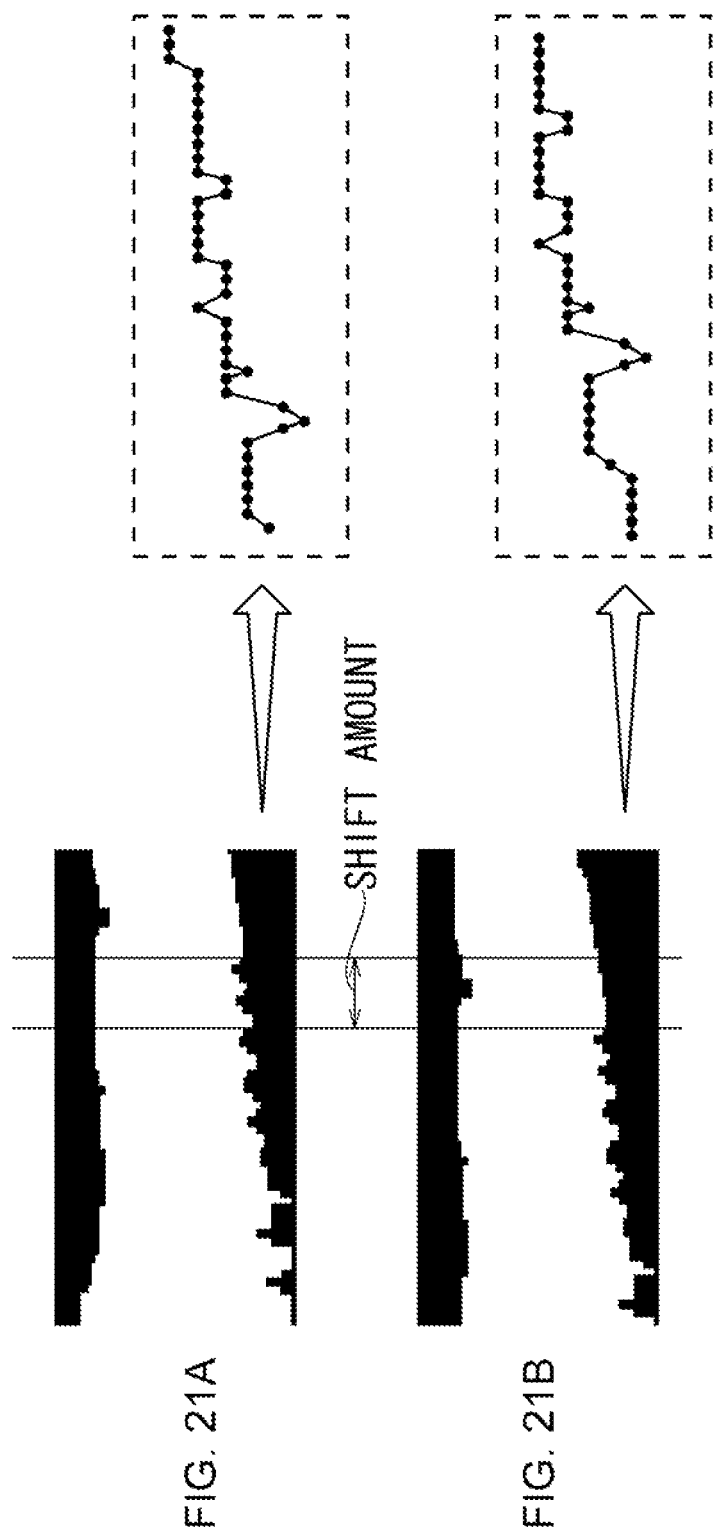
FIGS. 21A and 21B are schematic diagrams explaining how the contour of the finger changes as the finger shifts in its lengthwise direction.

The candidate selecting unit 71 finds a difference between the selection key data to be registered (i.e., the coordinate value x of finger contour) and the selection key data to be authenticated (i.e., the coordinate value x of finger contour), in units of rows (or columns). Hence, the finger contour will change as shown in FIGS. 21A and 21B when the finger extending along the upper edge of the LCD 111 is moved in the lengthwise direction after the selection key data is registered and before the vein data is authenticated, even if the user is the registrant.

In this case, the difference between the selection key data items compared is large through the user is the registrant. Consequently, the vein data of the registrant may not be selected, though it should be selected as a collation candidate.

The candidate selecting unit 160 uses either the selection key data to register or the selection key data to authenticate (i.e., coordinate value x of finger contour), as data about a shifting object. For example, as shown in FIGS. 22A to 22C, the selection key data SK about the shifting object (i.e., coordinate value x of finger contour) is moved, at a prescribed pitch, from the start position (FIG. 22A) to the end position (FIG. 22B) in the lengthwise direction of the finger.

Figure 22:
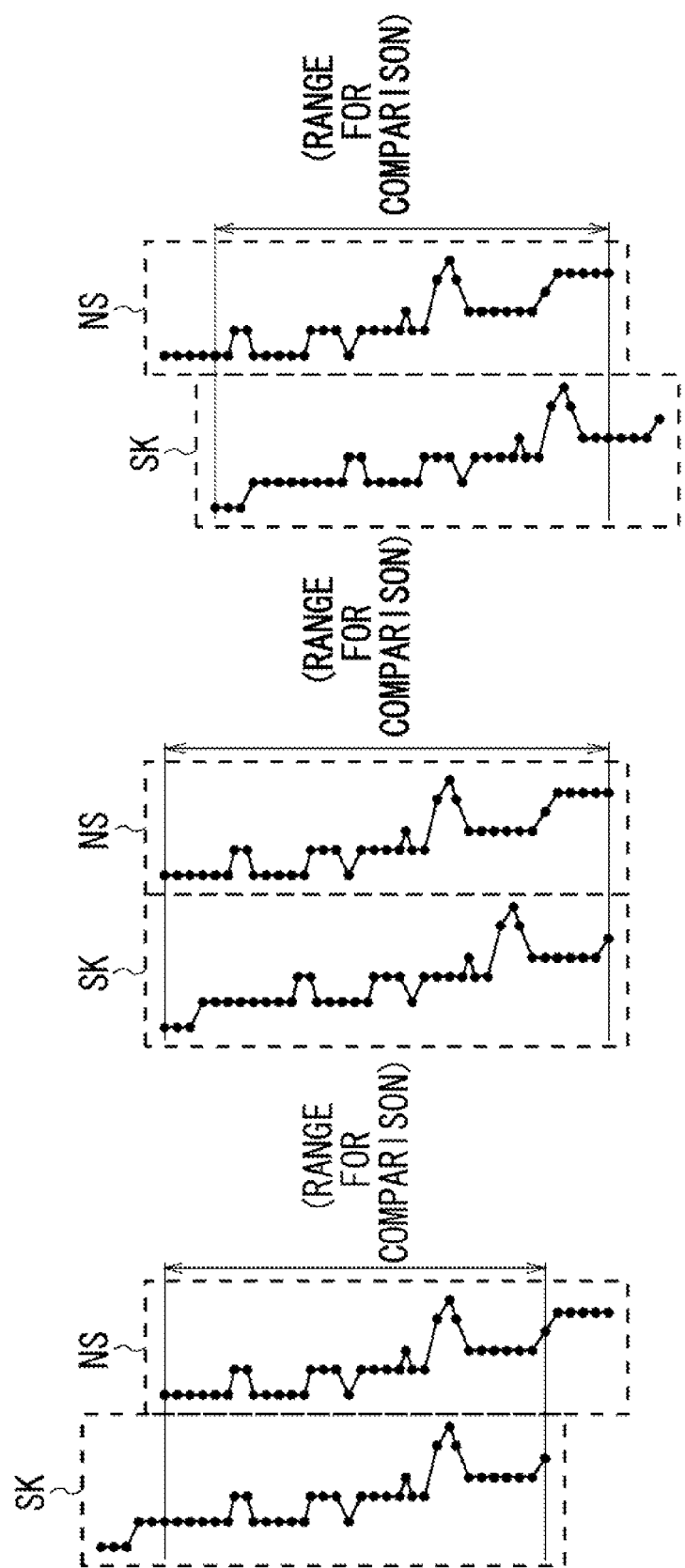
FIGS. 22A to 22C are schematic diagrams explaining how to calculate the change in the finger contour by taking into account the shift of the finger in its lengthwise direction.

The candidate selecting unit 160 obtains an average of the absolute-value differences at the positions (including the start and end positions) to which the object has been shifted in the finger contour (over the range indicated by arrows in FIGS. 22A to 22C). The minimum value obtained is applied as finger-contour difference value. Of the cases of FIG. 22A to 22C, the case of FIG. 22A has the minimum value.

More specifically, the candidate selecting unit 160 obtains the finger-contour difference value, using the following equation:

$$s = \min\left( \sum_{p=1}^{l_v - lS_{max}} \frac{\|S_{(r,p)} - S_{(i,p+lS_{max})}\|}{(l_v - lS_{max})}, \sum_{p=1}^{l_v - lS_{max}+1} \frac{\|S_{(r,p)} - S_{(i,p+(lS_{max}-1))}\|}{(l_v - lS_{max} + 1)}, \right.$$
$$\ldots, \sum_{p=1}^{l_v} \frac{\|S_{(r,p)} - S_{(i,p)}\|}{l_v}, \sum_{p=2}^{l_v} \frac{\|S_{(r,p)} - S_{(i,p-1)}\|}{(l_v - 1)}, \ldots,$$
$$\left. \sum_{p=lS_{max}}^{l_v} \frac{\|S_{(r,p)} - S_{(i,p-(lS_{max}-1))}\|}{(l_v - lS_{max} + 1)}, \sum_{p=lS_{max}+1}^{l_v} \frac{\|S_{(r,p)} - S_{(i,p-(lS_{max}))}\|}{(l_v - lS_{max})} \right) \quad (3)$$

where "lv" is the length of the finger contour, lSmax is the maximum shift, p is the index (position) defining the finger contour, and S is the finger-contour difference value for the index p.

In the equation (3), r is an object to register, and I is an object to authenticate.

Thus, the candidate selecting unit 160 takes, into account, the lengthwise shift of the finger that should be placed at a specific position.

To compare selection key data items, each representing the number of pixels of a luminance level, or selection key data items, each representing the number of vein image pixels, the candidate selecting unit 160 obtains finger region difference value and a blood vessel difference value, using the same technique as the candidate selecting unit 71 uses in the first embodiment.

Comparing the selection key data items, the candidate selecting unit 160 may obtain a finger-contour difference value, a finger region difference value and a blood vessel difference value. If this is the case, the unit 160 uses the equation (1) as in the first embodiment, thereby setting the finger-contour difference value, finger region difference value and blood vessel difference value within constant ranges (or normalizing these values).

Thereafter, the candidate selecting unit 160 uses the finger-contour difference value, finger region difference value and blood vessel difference value, thus normalized, and generates evaluation values in units of registered sets. In this respect, the candidate selecting unit 160 which generates evaluation values in units of registered sets differs from the candidate selecting unit 71, which generates evaluation values in units of individual vein data items.

That is, the vein data items in the respective registered sets pertain to the same person, though they differ from one another. The evaluation values found for these vein data items, respectively, are not greatly different and are small if the user to authenticate is the registrant.

Figure 23:
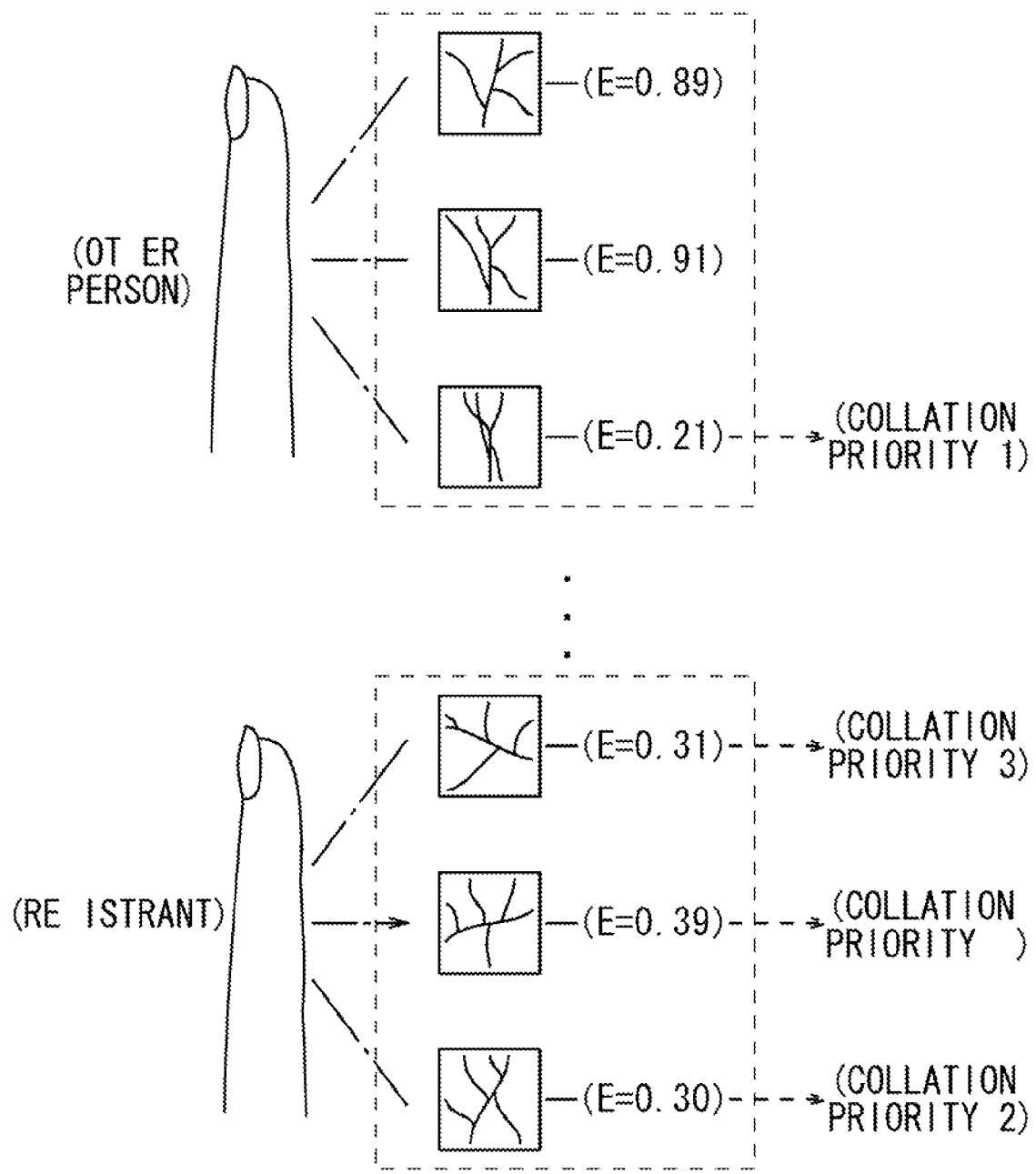
FIG. 23 is a schematic diagram explaining the problem arising if a collation candidate is selected based on an estimated value of vein data.

If evaluation value E found for only one of the vein data items contained in the registered sets is small as shown in FIG. 23, the probability that the user to authenticate is the registrant is very low. Nevertheless, the candidate selecting unit 71 in the first embodiment may select, as collation candidate, the vein data for which the evaluation value E is large, prior to the vein data about the registrant. This may lower the authentication speed.

Figure 24:
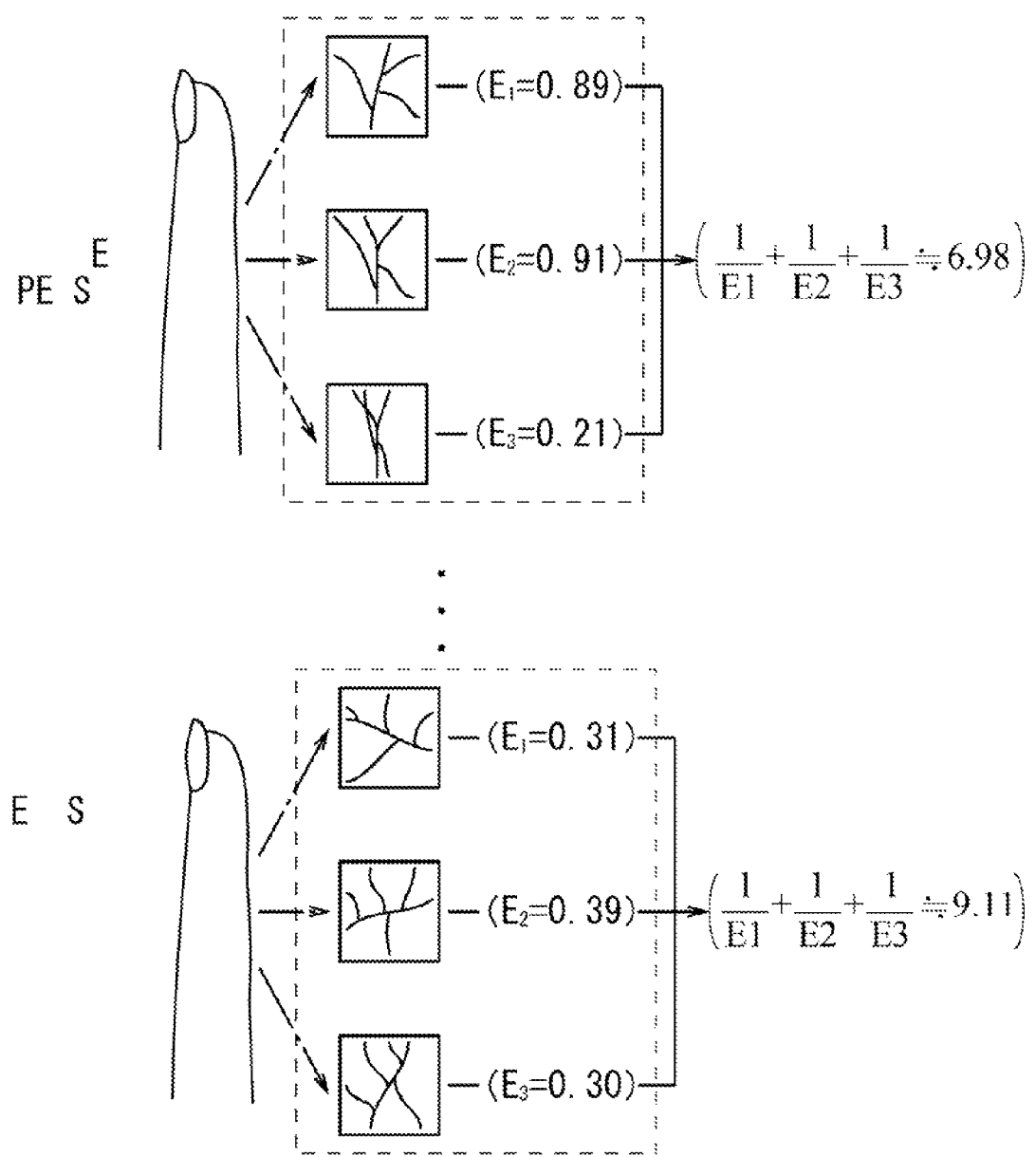
FIG. 24 is a schematic diagram explaining how to calculate the evaluation value of a registered set.

In view of this, the candidate selecting unit 160 is configured to find the sum of the reciprocals of values E evaluated by the equation (2) and pertaining to the vein data items in the registered sets, and then to use the sum as the evaluation value for the registered sets as shown in FIG. 24. Since the evaluation value E is the sum of the reciprocals of values E, the probability that the user is the registrant increases in proportion to the evaluation value E.

The candidate selecting unit 160 thus obtains a value evaluated in units of vein data items contained in the registered sets. This can prevent a decrease in the collation-candidate selection accuracy, which is caused if the evaluation value E pertaining to the vein data items contained in some of the registered sets is high.

The average of values obtained by the equation (2) or the sum of these values may be utilized to calculate the evaluation value of each registered set. In this case, the evaluation value will be too large for the registered set. The registered set for any person other than the registrant may then be selected prior to the registered set for the registrant, lowering the authentication speed. Such an event can be prevented, because the candidate selecting unit 160 uses the sum of the "reciprocals" of the values obtained by using the equation (2).

If the evaluation values are obtained for the respectively registered sets, the candidate selecting unit 160 selects the selection key data items of the registered sets having evaluation values equal to or greater than the threshold set for the evaluation values and the vein data items which should be registered and which are associated with the selection key data items. The selection key data items and the vein data items, thus selected, are used as candidates to collate with the vein data to authenticate. The candidate selecting unit 160 arranges the collation candidates in an order, as in the same way as the candidate selecting unit 71 does in the first embodiment.

(2-4) Operation and effect

The cellular telephone 100 having the configuration described above takes the shift of the finger in lengthwise direction into account, in order to obtain the finger-contour difference value, i.e., an index for selecting a collation candidate, from the selection key data (coordinate value x of finger contour), which represents the finger contour and which should be registered, and the selection key data (coordinate value x of finger contour), which represents the finger contour and which should be authenticated. (See the equation (3) and FIGS. 22A to 22C.)

The cellular telephone 100 can therefore obtain the finger-contour difference value, i.e., one index for selecting a collation candidate, more accurately than in the case where the lengthwise shift of the finger is not taken into account. Therefore, the vein data of the registrant is selected as collation candidate, without fail, when the registrant places his or her finger on the display screen of the cellular telephone 100. As a result, the registrant can be authenticated at high speed.

In addition, the cellular telephone 100 is structured to prevent the user's finger placed on the specified position from shifting in the widthwise direction of the finger (see FIG. 15). That is, the CCD is located to receive light emitted from the light source 121. More precisely, the CCD is arranged, opposing the light source unit 121 across the bases 122, and lies along the upper edge of the LCD 111 and between the bases 122a and 122b.

Using the selection key data (coordinate value x of finger contour) contained in the video data output from the CCD, the cellular telephone 100 obtains the finger-contour difference value, in consideration of the lengthwise shift of the finger. Therefore, any operation needs be performed to find the widthwise shift of the finger can be omitted. As a result, the registrant can be authenticated at a higher speed than otherwise.

In the registration mode, the cellular telephone 100 registers vein data items and key data items, all about the same finger, in the form of registered sets, each composed of a vein data item and the key data item associated therewith. In the authentication mode, the cellular telephone 100 selects any candidates of the registered set that should be collated with the vein data that should be authenticated.

To be more specific, the cellular telephone 100 calculates the sum of the reciprocals of values E obtained by using the equation (2), for the vein data items contained in the respective registered sets (see FIG. 24). Although the registered sets are used as units, the influence the evaluation value E imposes on the vein data contained in each registered set can be more accurately weighted than in the case where the average or sum of the evaluation values E is calculated.

Therefore, with the cellular telephone 100, the vein data of the registrant who should be selected as a collation candidate is prevented from being not selected as a collation candidate, even though the same finger of the identical person is placed on the display screen. Thus, the registrant can be identified at high speed.

The configuration described above finds an accurate finger-contour difference value that is used as an index for selecting a collation candidate, and obtains an evaluation value from that index, for each registered set. The cellular telephone 100 according to the second embodiment of the present invention can therefore authenticate a registrant at a higher speed than the authentication apparatus 1.

(3) Other Embodiments

In the embodiments described above, the vein data extracting unit 22 having the components 41 to 48 shown in FIG. 4 is used as a unit for extracting the vein data that represents the veins from an image including the veins existing in a finger. The invention is not limited to this configuration, nevertheless. Various changes may be made in configuration. For example, some of the components 41 to 48 may not be used at all or may be replaced by other components. Alternatively, additional processing units may be used. Similarly, the process techniques the components 41 to 48 perform (e.g., kernel size, etc.) may be changed.

In the embodiments described above, the data representing the position which the finger contour has at an intermediate stage of extracting the vein data, the data representing the frequency distribution of the region defined by the finger contour, and the data representing the vein area of the region defined by the finger contour are extracted. However, the present invention is not limited to this. If the data representing the position of the finger contour is extracted, any other data may not be extracted or may be replaced by a different data.

This is because, of the data representing the position which the finger contour has at an intermediate stage of extracting the vein data, data representing the frequency distribution of the region defined by the finger contour and data representing the vein area of the region defined by the finger contour, the data representing the position of the finger contour is the most accurate.

In the embodiments described above, collation candidates are selected by using the selection key data, and one collation candidate is determined by using the fixed key data. Nonetheless, the invention is not limited to this. A collation candidate may be determined by using the selection key data. In this case, too, the speed of authentication can be increased as compared with the conventional authentication technique.

In the embodiments described above, the data (FIG. 7C) representing the distance from a point in a specific region is utilized as data representing the position of the finger contour. Instead, Bézier curves or the like may be used to extract a control point, or any other techniques may be employed.

In the embodiments described above, a luminance histogram is used as the frequency distribution of the finger region. The invention is not limited to this, nonetheless. Instead, a histogram may be extracted for all or some of the three primary colors, or any other extracting techniques may be employed.

In the embodiments described above, the authentication apparatus 1 has an imaging function (imaging unit 12), a registering function (FIG. 2), and an authenticating function (FIG. 3). However, the present invention is not limited thereto. Rather, it may be applied to an apparatus that has one or some of these functions.

The present invention can be utilized in the field of biometric authentication.

It should be understood by those skilled in the art that various modifications, combinations, sub-combinations and alterations may occur depending on design requirements and other factors insofar as they are within the scope of the appended claims or the equivalents thereof.

What is claimed is:

1. An authentication apparatus comprising:
a vein data extracting unit that extracts vein data representing veins, from a first image including the veins existing in a finger;

an extracting unit that extracts position data representing a position of a contour of the finger at an intermediate stage of extracting the vein data; and a determining unit that determines a collation candidate to be collated with the vein data, based on similarity between the position data and data associated with the vein data to be registered.

2. The authentication apparatus according to claim 1, wherein the extracting unit extracts first data representing the position of pixels defining the contour of the finger, which are spaced at regular intervals, from a first specific region of a second image generated at the intermediate stage.

3. The authentication apparatus according to claim 1, wherein the extracting unit extracts second data representing a distance from a first reference point in the first specific region, with respect to the position of the pixels spaced at the regular intervals.

4. The authentication apparatus according to claim 3, wherein the determining unit determines the collation candidate to be collated with the vein data, by using a first difference between a first distance from the first reference point in the first specific region and a second distance from a second reference point in a second specific region associated with the vein data to be registered.

5. The authentication apparatus according to claim 3, wherein the first specific region or the second specific region is used as an object to be shifted, and the collation candidate to be collated with the vein data is determined by using a second difference obtained every time the first specific region or the second specific region used as the object to be shifted is shifted in a lengthwise direction of the finger.

6. The authentication apparatus according to claim 1, wherein the vein data extracting unit extracts the vein data from the first image output from an imaging unit that receives near infrared light and arranged, opposing a near infrared light source across a display unit that instructs a user to place the finger on a surface extending in a lengthwise direction of the finger.

7. The authentication apparatus according to claim 1, wherein a second image generated at the intermediate stage is generated when a noise component is removed from the first image by the vein data extracting unit.

8. The authentication apparatus according to claim 1, wherein the extracting unit extracts at least two data items selected from: the position data representing the position of the contour of the finger at the intermediate stage of extracting the vein data, frequency data representing a frequency distribution of a region defined by the finger contour, and vein area data representing a vein area in the region defined by the finger contour.

9. The authentication apparatus according to claim 1, wherein the extracting unit acquires, from the vein data extracting unit, a second image generated when a noise component is removed from the first image including the veins existing in the finger and a binary image represented by binary data, extracts data representing the position of the finger contour from the second image, and extracts, from the binary image, data representing vein area in a region defined by the finger contour.

10. An authentication apparatus comprising:
a vein data extracting unit that extracts vein data representing veins, from a first image including the veins existing in a finger;
an extracting unit that extracts position data representing a position of a contour of the finger at an intermediate stage of extracting the vein data, wherein the extracting unit extracts, from a first specific region of a second image generated at the intermediate stage of extracting the vein data, first data representing a first distance from a first reference point in the first specific region, with respect to position of pixels spaced at regular intervals, and second data representing vein area in a region defined by the finger contour, among the pixels defining the contour of the finger; and
a determining unit that determines a collation candidate to be collated with the vein data, based on similarity between the position data and data associated with vein data to be registered, wherein the determining unit determines the collation candidate to be collated with the vein data, by using a sum of a first ratio and a second ratio, the first ratio being a ratio of a first reference value to an absolute value of a first difference between the first distance from the first reference point in the first specific region and a second distance from a second reference point in a second specific region associated with the vein data to be registered, and the second ratio being a ratio of a second reference value to a second difference between the vein area and the vein area associated with the vein data to be registered.

11. The authentication apparatus according to claim 10, wherein the sum is obtained for the vein data contained in each registered set, and the collation candidate to be collated with the vein data is determined for each registered set by using summation of reciprocals of the sum in each registered set.

12. The authentication apparatus according to claim 1, further comprising:
a generating unit that acquires a third image represented by binary data and composed of a background part and a vein part representing veins of a fixed width from the vein data extracting unit and compresses the third image, thereby generating a compressed third image,
wherein the determining unit comprises:
a candidate selecting unit that selects the collation candidate to be collated with the vein data, based on similarity between the position data and the data associated with the vein data to be registered; and
a candidate determining unit that determines the collation candidate to be collated with the vein data, based on similarity between the compressed third image and a compressed image associated with the vein data which has been selected as the collation candidate and which should be registered.

13. An authentication method comprising:
extracting vein data representing veins, from a first image including the veins existing in a finger;
extracting position data representing a position of a contour of the finger at an intermediate stage of extracting the vein data; and
determining a collation candidate to be collated with the vein data, based on similarity between the position data and data associated with the vein data to be registered.

14. A registration apparatus comprising:
a vein data extracting unit that extracts vein data representing veins, from a first image including the veins existing in a finger;
a key data extracting unit that extracts a plurality of data items representing a state of the finger at one or more intermediate stages of extracting the vein data as key data of a plurality of collation candidates; and
a registering unit that registers, in a storage unit, the vein data in association with the key data, wherein the key data extracting unit comprises:

a selection key data extracting unit that extracts data representing a position of a contour of the finger at an intermediate stage of extracting the vein data as the key data for selecting a collation candidate from the plurality of collation candidates; and a fixed key data extracting unit that acquires, from the vein data extracting unit, a third image represented by binary data and composed of a background part and a vein part representing veins of a fixed width, to compress the third image, thereby generating a compressed third image, and extracts the compressed third image as the key data for determining the collation candidate from the selected plurality of collation candidates.

15. The registration apparatus according to claim 14, wherein the key data extracting unit extracts data representing positions, which are spaced at regular intervals among pixels defining contour of the finger, from a specific region of a second image generated at the intermediate stage.

16. The registration apparatus according to claim 15, wherein the key data extracting unit extracts data representing a distance from a reference point in the specific region, with respect to the positions of the pixels spaced at the regular intervals.

17. The registration apparatus according to claim 15, wherein the second image generated at the intermediate stage is generated when a noise component is removed from the first image including the veins existing in the finger from the vein data extracting unit.

18. The registration apparatus according to claim 14, wherein the key data extracting unit extracts at least two data items selected from: first data representing a position of a contour of the finger at an intermediate stage of extracting the vein data, second data representing a frequency distribution of a region defined by the finger contour, and third data representing a vein area in the region defined by the finger contour.

19. The registration apparatus according to claim 14, wherein the key data extracting unit acquires, from the vein data extracting unit, a second image generated when a noise component is removed from the first image including the veins existing in the finger and a binary image represented by binary data, extracts data representing position of finger contour from the second image, and extracts, from the binary image, data representing a vein area in a region defined by the finger contour.

20. A registration method comprising:
extracting vein data representing veins, from a first image including the veins existing in a finger;
extracting a plurality of data items representing a state of the finger at one or more intermediate stages of extracting the vein data as key data of a plurality of collation candidates;
extracting data representing a position of a contour of the finger at an intermediate stage of extracting the vein data as the key data for selecting a collation candidate from the plurality of collation candidates;
acquiring a third image represented by binary data and composed of a background part and a vein part representing veins of a fixed width, to compress the third image, thereby generating a compressed third image;
extracting the compressed third image as the key data for determining the collation candidate from the selected plurality of collation candidates; and
registering, in a storage unit, the vein data in association with the key data.

* * * * *